(12) United States Patent
Barnett et al.

(10) Patent No.: US 6,604,014 B1
(45) Date of Patent: Aug. 5, 2003

(54) REMOTE AND PROXIMAL GUARD TESTING SYSTEMS AND TESTING SYSTEMS EITHER SEPARATELY OR IN CONJUNCTION WITH INTERLOCK TESTING MECHANISMS AND SYSTEMS

(76) Inventors: Ralph L. Barnett, Triodyne, Inc., 5950 W. Touhy Ave., Niles, IL (US) 60714-4610; Theordore Liber, Triodyne, Inc., 5950 W. Touhy Ave., Niles, IL (US) 60714-4610

( * ) Notice: Subject to any disclaimer, the term of this patent is extended or adjusted under 35 U.S.C. 154(b) by 0 days.

(21) Appl. No.: 09/033,322

(22) Filed: Mar. 2, 1998

(51) Int. Cl.[7] ............................................. G06F 19/00
(52) U.S. Cl. ..................... 700/177; 702/44; 702/113; 324/513; 340/542; 340/545.1
(58) Field of Search .................. 700/174, 169, 700/177, 301, 302; 702/44, 58, 113, 115, 116, 121, 184; 324/513, 756; 340/542, 545.1, 545.6

(56) References Cited

U.S. PATENT DOCUMENTS

| | | | | |
|---|---|---|---|---|
| 3,623,062 A | * | 11/1971 | Hawkins | 340/542 |
| 3,999,046 A | * | 12/1976 | Porter | 702/44 |
| 4,139,118 A | * | 2/1979 | Parker | 220/316 |
| 4,225,284 A | * | 9/1980 | Masek et al. | 415/16 |
| 4,845,475 A | * | 7/1989 | Cooledge et al. | 340/644 |
| 4,944,473 A | * | 7/1990 | Kallies et al. | 244/129.5 |
| 5,281,857 A | * | 1/1994 | Keese | 307/115 |
| 5,625,266 A | * | 4/1997 | Stark | 318/466 |
| 5,633,626 A | * | 5/1997 | Cawthorne | 340/545.1 |
| 5,648,719 A | * | 7/1997 | Christensen et al. | 324/207.26 |
| 5,727,405 A | * | 3/1998 | Cromwell | 70/38 B |
| 5,735,487 A | * | 4/1998 | Abild et al. | 244/129.5 |
| 5,780,987 A | * | 7/1998 | Fitzgibbon et al. | 318/466 |
| 5,870,317 A | * | 2/1999 | Barnett et al. | 703/6 |
| 5,884,237 A | * | 3/1999 | Kanki et al. | 702/113 |
| 6,060,796 A | * | 5/2000 | Schmitz et al. | 307/326 |

* cited by examiner

Primary Examiner—Leo Picard
Assistant Examiner—Paul Rodriguez

(57) ABSTRACT

This invention relates to novel systems for testing guards closures or barriers used on hazardous machinery for personnel protection. The guards are tested separately or in conjunction with safety devices which may include interlocks, locking mechanisms and latching devices. The testing process proceeds without having to shut down the machine on which the guarding system is mounted. Testers are incorporated in the process for establishing the integrity of the safety devices and for executing self-testing. Also included are various novel devices that are unable in such systems.

50 Claims, 41 Drawing Sheets

FIG. 2

| FIG. 2A |
|---|
| FIG. 2B |

FIG. 3

| FIG. 3A | FIG. 3B |
|---|---|
| FIG. 3C | FIG. 3D |

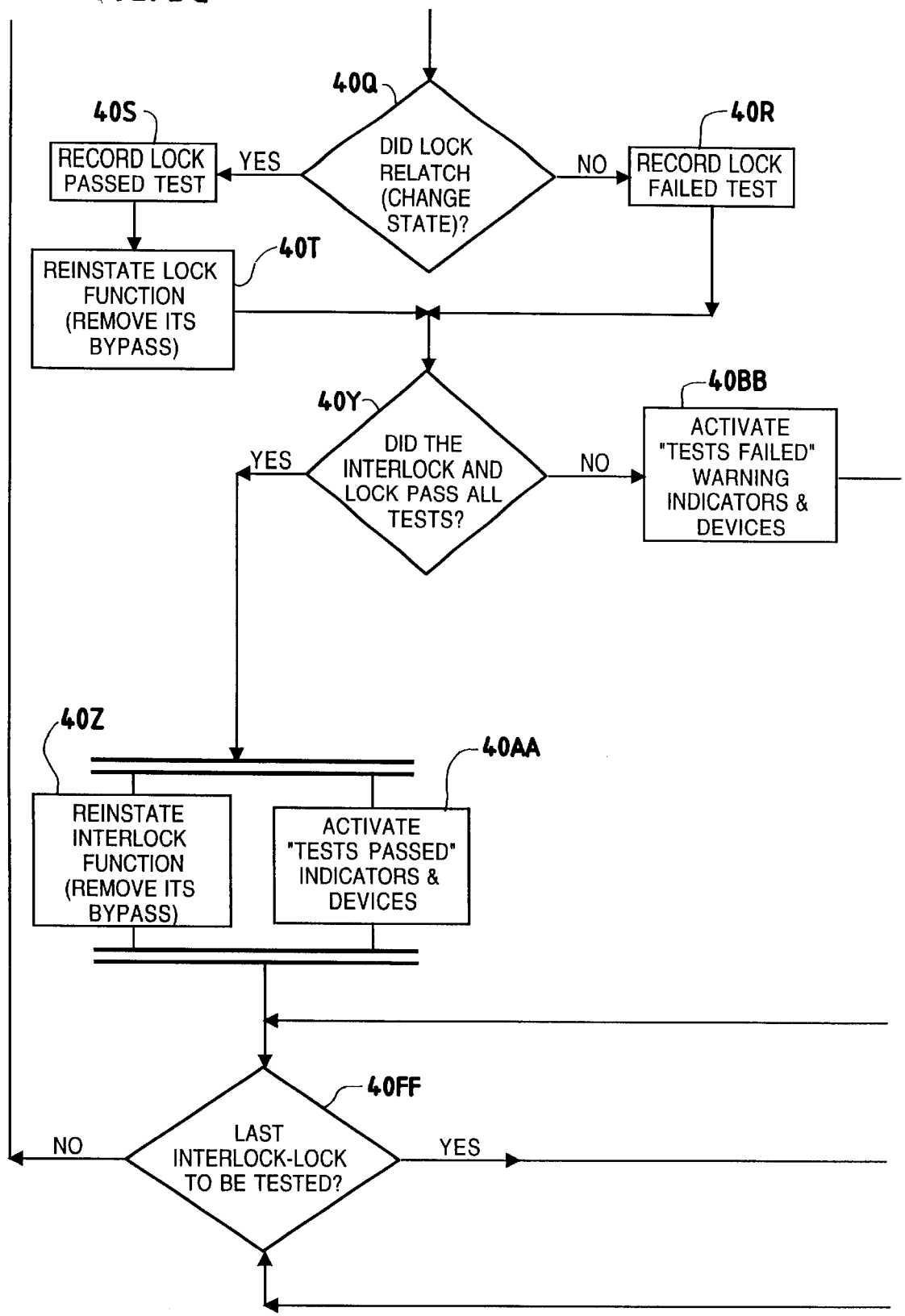

FIG. 4

| FIG. 4A | FIG. 4B |
|---------|---------|
| FIG. 4C | FIG. 4D |

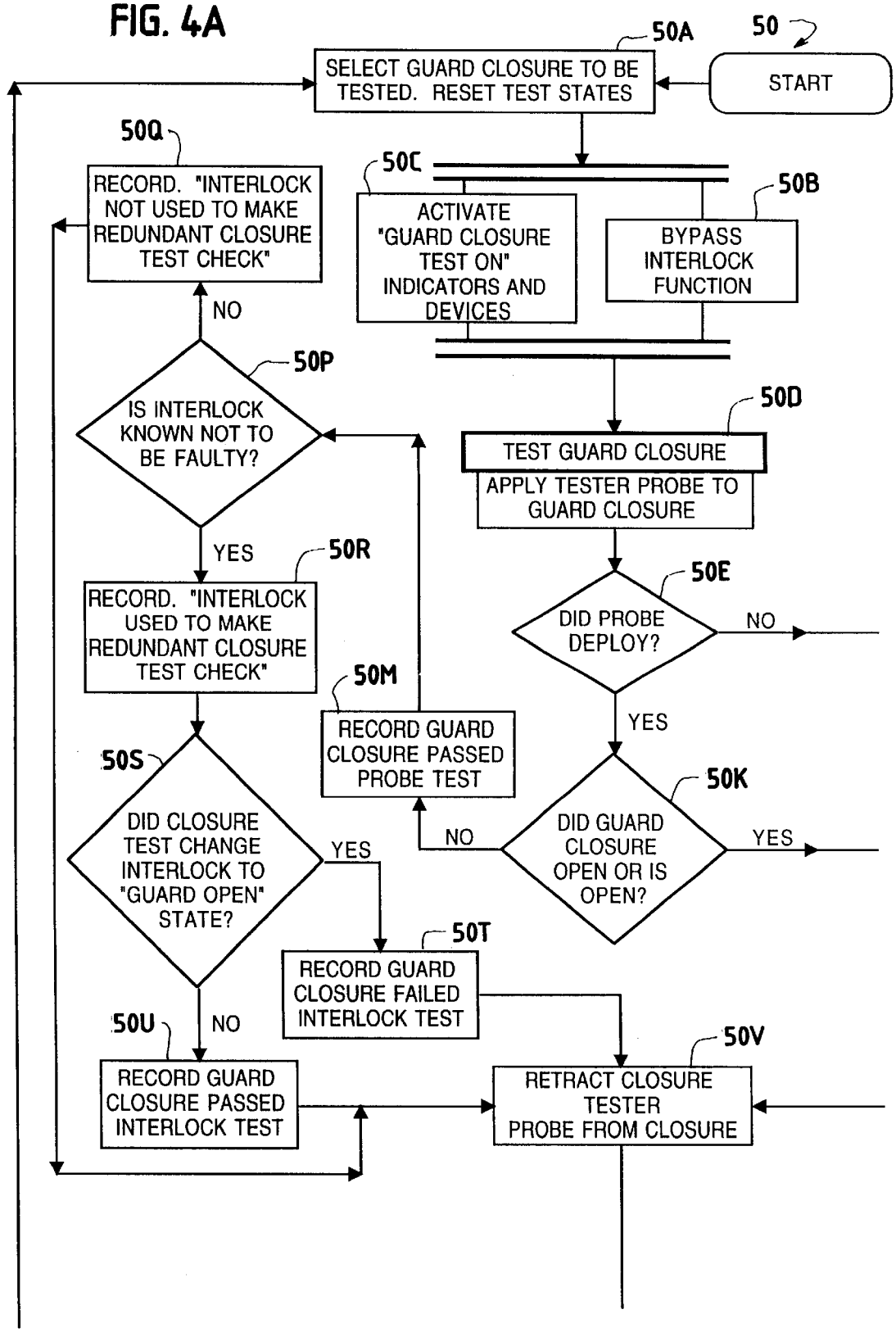

FIG. 5a

| FIG. 5a-2 | FIG. 5a-1 |
|---|---|
| FIG. 5a-3 | FIG. 5a-4 |

FIG. 6a

| FIG. 6a-2 | FIG. 6a-1 |
|---|---|
| FIG. 6a-3 | FIG. 6a-4 |

FIG. 7

| FIG. 7A | FIG. 7B |
|---|---|
| FIG. 7D | FIG. 7C |

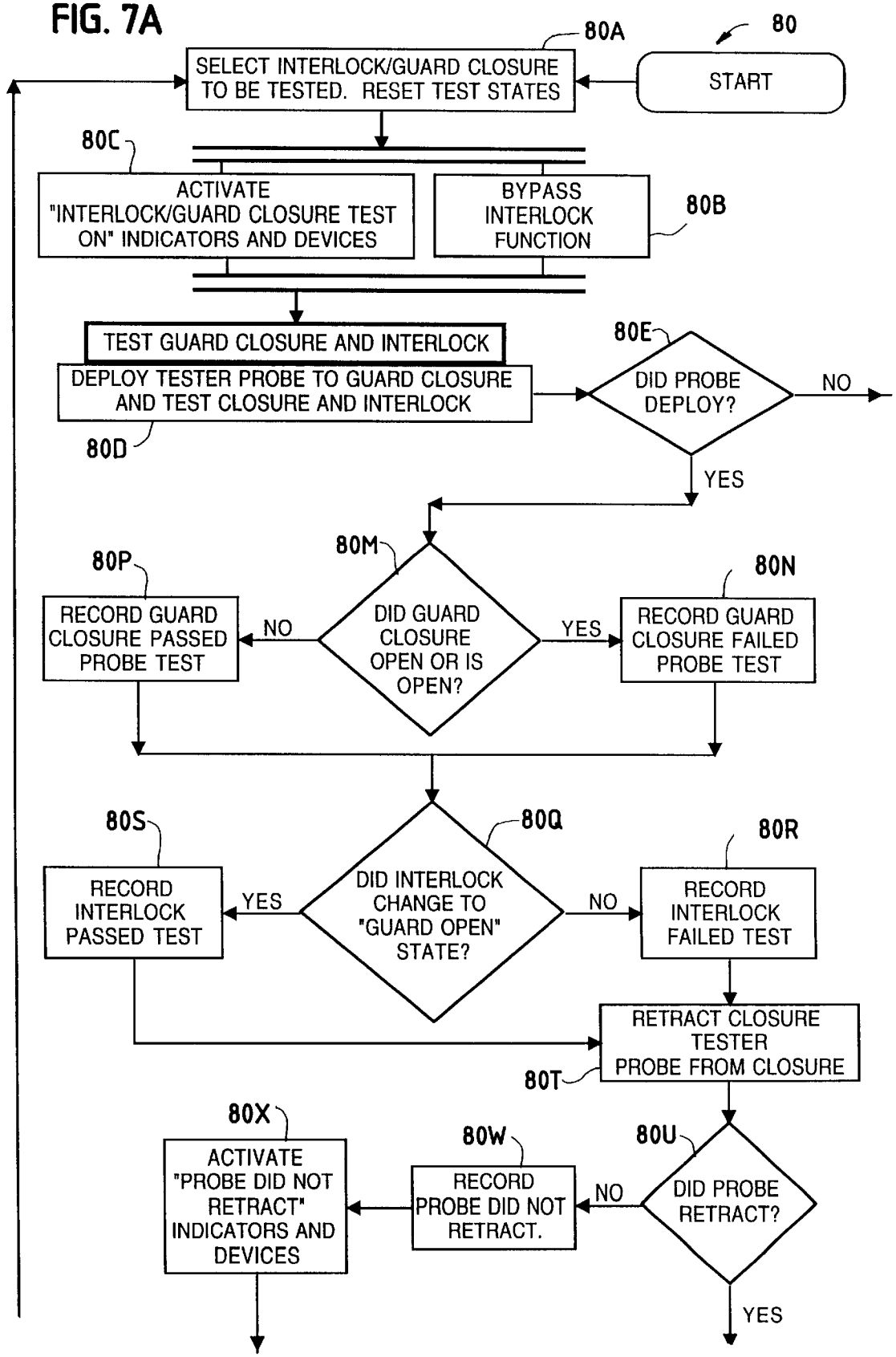

FIG. 8

| FIG. 8A | FIG. 8B |
|---------|---------|
| FIG. 8C | FIG. 8D |

REMOTE AND PROXIMAL GUARD TESTING SYSTEMS AND TESTING SYSTEMS EITHER SEPARATELY OR IN CONJUNCTION WITH INTERLOCK TESTING MECHANISMS AND SYSTEMS

FIELD OF THE INVENTION

This invention relates to the testing of various types of guard mechanisms for preventing access to a machine containing safety hazards. Such guard devices can exist alone or in conjunction with interlock mechanisms.

The guards are typically structural barriers that are locked in position and can consist of doors, gates, covers, latches and so forth. They will be variously referred to in this application by the synonymous terms, guards, closures and guard closures. In the usual situation the guards are not intended to be open and are only to be opened when the machine has come to a complete rest. When the guard is open it is intended that the machine has been shut down and will remain in the changed condition until the guard is closed even if there is an attempt to restart or restore the operating state of the machine at the main control box of the machine or from elsewhere.

BACKGROUND OF THE INVENTION

Guarding devices have long been used to prevent access to hazardous areas of machinery. Unfortunately there is a constant and continuous need to work on industrial equipment and every precaution must be taken to insure that prior to permitting a worker to work on the machinery the machine has come to a complete stop. It thus must be insured that the guards that are ever present to prevent entry into hazardous areas can not be opened to permit access until the machine has in fact come to a complete stop.

The present invention is directed to testing systems and mechanisms for insuring the integrity of the devices that indicate the status of machine operation so that guards may not be opened until the machine is completely shut down. Such devices are known as run down completion detectors which, when operating without fault, determine if the machine components within the hazardous space have stopped moving or not. Safeguarding systems include electrical and electronic components that consists of control and sensing systems with associated circuitry. In addition there are mechanical components that in addition to the guard closure include a lock and very possibly interlocks and run down completion detectors such as 1) motion detectors, 2) zero speed switches or detectors, 3) timing devices that are predicated on the fact that the run down times are known and can be relied upon 4) delay devices that also require that the machine components run down times can be relied upon and 5) interference devices that can be inserted in to the motion path of the machine components to insure that the machine has come to a complete stop.

In addition to the aforementioned devices to insure that the machine has come to a complete rest, mechanical interlocks or motion blockers can be inserted to absolutely prevent the machine from restarting until they are removed.

The current state of the art for testing the electrical and electronic components of the safeguarding systems is quite advanced. Commercial self testing systems are available which continuously or intermittently, remotely or proximally check for electrical/electronic faults in the system for single or multiple guard closures, during the running of the machine or when stopped, with the guard closures closed or open. If a fault is detected during the running of the machine, the machine is stopped. If detected during stoppage the machine can not restart until the fault is corrected.

However, the state of the art for testing mechanical components of the safeguarding systems is very primitive. For example the previously mentioned commercial self testing systems are not designed to detect failure or breakdown of the mechanical components of the safeguarding system while the machine is running. For mechanical failure or breakdown to be revealed to its electrical/electronic sensing system the mechanical exercising of the guard closure is required. There are currently no provisions or devices provided to exercise the mechanical components for testing purposes during running of the machine probably because such exercising would stop the machine. If the machine is stopped and the guard closure is opened then closed the electrical/electronic test systems will detect mechanical failures or breakdowns in the protective system.

There exists the obvious approach for testing the mechanical components mechanically by opening and closing each guard closure manually or automatically to determine if the machine is at rest when the guard closure is first unlocked, if power is interrupted whenever the guard closure is open, and if restart is allowed immediately upon reclosing. This is not a practical testing system, except in very restrictive circumstances, e.g. where there are few guard closures and generous amounts of time available for testing.

Accordingly, it appears to be very desirable that there be a test system for the mechanical testing of the mechanical components of safeguarding systems during running of the machine to detect if they have failed or not. Such systems to be most useful must be capable of testing the machine while it is running without stopping it.

In addition it would be desirable if the testing of the guards could be done in conjunction with the testing of the interlocks systems which are present on machines adjacent to guards to shut down machines when the guards are opened if the machine has not previously been shut down and prevents the resumption of powered operation of the machine while the guard is open.

Novel interlocks, interlock testing, testing systems and methods of testing have been extensively detailed in an application Ser. No. 08/861,328 now U.S. Pat. No. 5,870,317 entitled REMOTE AND PROXIMAL INTERLOCK TESTING MECHANISMS AND TESTING SYSTEMS filed in the names of the present inventors and assigned to the same assignee TRIODYNE INC. as the present invention. The filing date of said application is May 21, 1997 and is incorporated by reference into this application as setting forth in detail various interlock systems and methods of testing interlocks. A provisional application covering the same was filed on Mar. 3, 1997.

Referring again to the instant invention there are testing systems and apparatus for sensing the movement of a force displacement device applied as an opening force to the guard closure. The force of the displacement device may be constant or variable as the test situation demands.

The instant invention directs the testing of the guard closures and the testing of the interlocks to be performed during running of the machine and during the rundown phase of the machine when the machine is shut down. It does so without shutting the machine down due to the testing, as described in this submission and the previously referenced U.S. Pat. No. 5,870,317. This is done so, because for reasons of safety it is important to establish that during running of the machine and during its rundown phase, access is denied to the guard protected spaces containing running machine components, and that the interlocks provide the protection for which it has been designed. The guard closure and interlock testing methods, processes, devices and systems of the instant invention and in the U.S. Pat. No. 5,870,317 are designed to determine if that is the case, or if the case is that any specific guard closure and/or interlock have failed, hence no longer provide the expected protection. These are conditions which would be unknown without testing.

The overall system is illustrated by example, schematically in FIG 1. Examples of a main routine for testing interlocks and guard closures is illustrated in FIGS. 8A, 8B, 8C and 8D and various novel subroutines of testing systems for separate guard closures and in conjunction with closure and interlocking and closure testing mechanisms and systems as illustrated in FIGS. 2–7 and 9–15. An overall description of applicants inventions are set forth under the following SUMMARY OF THE INVENTION and will be described in detail under the DESCRIPTION OF THE PREFERRED EMBODIMENTS.

SUMMARY OF THE INVENTION

The present invention includes a first novel system for testing a guard closure with a guard closure lock that is not protected by an interlock and includes the utilization of a program controller that will be connected up to a tester probe that can take various forms, which probe is to be mechanically moved to engage the guard closure. An example of a testing unit is set forth in FIGS. 9–11. The controller will be programmed to activate a guard closure test with the machine running and the guard closure lock allegedly latched. The first test will be to see if the probe will deploy so that the testing can take place. If the probe does not deploy, the guard closure cannot be tested and its failure will be so indicated at the program controller and will call for the scheduling of the necessary tester repair or replacement. If the probe does deploy then a sensor will indicate that the guard closure opens or is open or remains closed. If the guard closure is open the guard closure will have failed the test and if it is not open it will record that the guard closure passed the test. Following this test the probe will be retracted and the sensor will so advise the controller that the probe did retract or did not retract. If retraction of the probe did not take place the necessary repair and/or replacement will have to be scheduled to occur. If the closure passes all the tests it will be so indicated. If it did not pass all the tests there will be a suitable "test failed" warning indicator and depending on how the system is programmed, machine will be shut down or will be permitted to continue to run with the controller indicating the failures that did occur. If the machine shuts down, the guard closure testing system will be deactivated. If it is not shut down the program controller can be scheduled to continue to sequentially test a number of guard closures until the last guard closure is tested. At the completion of the testing of the last guard closure the guard closure test system will be deactivated.

The aforementioned system is an arrangement wherein the guard closure with its guard closure lock is tested and is not subsequently protected by interlocks. Another testing procedure that is an important aspect of the applicants invention is to be able to test interlocks of guards that are equipped with integral interlock-lock devices and which in a typical situation, when the guard is closed, will have the lock latched to the guard. For identification purposes this testing, procedure will be referred to as a second novel system FIGS. 3, 3A, 3B, 3C and 3D.

The integral interlock-lock is typically a device which houses both the interlock and the guard lock in a combined housing. The mechanical testing of the interlock for such a coupled device requires the unlatching of its lock from the guard before the interlock testing can be executed.

In this testing system before the interlock of a particular integral interlock-lock device is tested, the interlock function and the lock function is bypassed so that testing of the interlock and lock will not result in shutting down the machine. In this system a program controller will be activated to show that the testing process is to begin. This particular system will include a mechanism for unlatching the lock and if the lock unlatches by changing its state the change of state is indicated on the controller. If the lock did not unlatch then of course the interlock can not be tested and suitable indication will be made to show that the lock did not unlatch. In this particular situation if it is not desired to shut the machine down the controller will indicate that the guard latching system has to be repaired or replaced. The bypass functions will then be removed to reinstate the protection afforded by the interlock and lock.

Returning to the situation in which the lock did unlatch, the interlock tester will then be activated to move the interlock to its "guard open" position. It is to be noted again that various types of interlock testers and testing systems that would be acceptable in the instant system are discussed in great detail in the aforementioned U.S. Pat. No. 5,870,317 assigned to the assignee of the present invention which application is incorporated herein by reference. The details of the interlocks are not important to an understanding of the present invention except to note the following features of faultless interlocks. When an interlock is moved relative to the guard closure it protects, or vice versa, the interlock's sensing mechanisms changes state. When the interlock and guard closure are brought back together the interlock sensing system returns to its original state. The testing of the interlock is done by producing these relative displacements and determining if the required changes of state happen.

If the interlock fails to change its state to the "guard open" state by this test it will be recorded that the interlock failed the test and if it did change state the fact that the interlock passed the test will be recorded.

Since this system is used to test the interlock the interlock tester will as the next step restore the interlock to its "guard closed" position and will check if it has thereby returned to its "guard closed" state. If it failed to return to the "guard closed" state, recording of this will be made and if it did return the fact that the interlock passed the test will be so indicated. Following the aforementioned test the lock will be relatched and the system will be tested to check if the lock did relatch which would be to change its state back to what it was originally. If it did not return to its original state a recording to the effect that the lock failed to relatch will be made and if it did return the controller would indicate that the lock did relatch. Upon indicating that the lock relatched the bypassing of the lock in the system will be removed to restore its original protection. If the interlock passed all the tests this will be recorded, the interlock function will be restored by removing its bypass to restore its original protection and the program controller will sequentially test the interlocks of other integral integral-lock devices. If the interlock did not pass the tests the "test failed" warning indicators and devices will be activated and the machine may be shut down due to test failures and be repaired at that time, or not be shut down and just indicate what has occurred and continue to test other interlock-lock systems until the last one is tested at which time the program controller will be deactivated.

The present invention also includes a third novel system FIGS. 4, 4A, 4B, 4C and 4D comprising a guard closure test routine in which the closures are also protected by interlocks but wherein the locks and interlocks are not integral devices and the interlock is used to make a redundant closure test check. In this testing system one will first select a guard closure to be tested and reset the test routines to their test initiation states in which the guard closure locks are latched. Initially the interlock mechanisms are bypassed so that the testing of the guards will not shut down the machine in the event that the guard moves to the open position when a guard testing device such as a probe is used to attempt to open the guard closure. In addition to bypassing the interlocks "guard closure test on" indicators and devices are activated. As discussed in the earlier embodiment referred to as the first novel system the guard closure is tested by deploying a tester probe against the guard closure, and a program controller will indicate if the probe actually did deploy. If the probe did not deploy the test of this particular closure is terminated and the interlock function will be reinstated so that in the event the closure is opened the interlock will function normally, to turn off the machine.

A recording of the inactivity of the probe will be made and a suitable indicator will show that the guard cannot be tested and that necessary repair and/or replacement is required. If the probe did deploy then the amount of probe movement will indicate if the guard closure is closed, open or can be opened. An indication that the guard closure is in an open or opening condition will be recorded indicating that there is a problem with respect to the particular guard in question. If the guard closure is not opened this will be noted and if the interlock is known not to be faulty then the interlock will be used to make a redundant test check of the closure status. A known to be faulty interlock or one of unknown condition will not be used to make a closure test check. If it is indicated by the interlock that the guard is in the open position then the fact that the guard closure did fail the interlock test will be signaled. As the next test step, the closure tester probe is retracted and a test conducted to see if the probe did retract. Failure to retract will be recorded and replacement and/or repair will be scheduled. If the closure and probe passed all the tests the "test passed" indicators and devices will so indicate and the interlock function will be reinstated by removing the bypass to restore its original protection. Any failures will activate "test failed warning indicators and devices" and shut down the machine or not as desired and then move on to test another subsequent guard closure following the same method as herein aforesaid.

Another method of testing of allegedly locked guard closures which are also protected by interlocks can be done by a novel fourth system FIGS. 5a, 5a-1, 5a-2, 5a-3, 5a-4 and 5b calling for a sequential testing first of the interlock and then the closure. In this embodiment the test initiation states of the interlocks and guard closure test routines are reset and the appropriate indicators and devices are activated showing that the interlock and guard closure tests are being done. Also the interlock function is bypassed so that if the guard is opened by the guard closure test the interlock will not shut down the machine. The testing of the interlock will then be accomplished by changing, the interlock to the "guard open" position and then making the appropriate tests and records. If the interlock passes or fails the test this will be recorded and indicated. The interlock will then be restored by its tester to the "guard closed" position and checked if it has so returned. If it failed to return to the "guard closed" state, recording of this will be made and if it did return the fact that the interlock passed the test will be recorded. Following, the testing of the interlock the guard closure is tested in the same manner as set forth when discussing the novel third system.

Another system that could be employed is one that includes sequential testing of the interlock and then the closure where the allegedly locked closures are protected by an integral interlock-locking, device. This system embodies interlock testing as set forth in the previously described second system, the guard closure test from the previously described fourth system and the redundant closure test check by means of the interlock also from the previously described fourth system.

This fifth testing system FIGS. 6a, 6a-1, 6a-2, 6a-3, 6a-4, 6b, 6b-1, 6b-2 and 6b-3 includes a program controller that is initially programmed to bypass the interlock and lock function and activate the "tests on" indicators and devices and includes a locked guard closure. The interlock is tested by first unlatching the lock and testing if the unlatching did or did not occur. If it did not occur a record will be made of this and that the interlock cannot be tested. In this case the interlock will not be used to make a redundant closure test check since the interlock was not tested.

In the event the lock did unlatch by changing its state this system will test the interlock of the integral interlock-lock arrangement, as set forth in detail when describing the second system. Following the testing, of the interlock, the guard closure will be tested as set forth in the fourth system wherein a test device such as a probe is used with respect to a guard and its action tested and the interlock will be used to make a redundant closure test check if the interlock has been tested and if it had not failed the interlock tests.

This fifth system slightly differs from the fourth system since while the closure test probe may not deploy, which is a failure of the closure tester, and will be so recorded and indicated, the integral interlock-lock may pass all tests and thus provision is made to reinstate the interlock function by removing the interlock bypass and also the lock bypass to restore their protective functions and activate the "tests passed" indicators and devices. For all tests which did not pass, the "tests failed" warning indicators and devices will be activated and the program controller will so indicate, and a choice can be made to shut down the machine or allow the machine to operate while indicating what has occurred.

A sixth novel system FIGS. 7, 7A, 7B, 7C and 7D forming part of applicants invention is a routine for testing, allegedly locked closures protected by interlocks where there is a simultaneous testing of both the closure and the interlock with the same tester. The tester is so constructed that it performs the tasks of testing the guard closure and the interlock by the same action. In this system the interlock and/or tester is compliant base mounted as described in detail in the aforementioned pending, application that is incorporated herein by reference, but the tester and interlock are rigidly linked together. Prior to starting, one will select the interlock/guard closure to be tested and will reset their test routines to their test initiation states. Initially one will activate the "interlock/guard closure tests on" indicators and devices and bypass the interlock function and then test the guard closure and the interlock by deploying the tester probe to the guard closure and testing the closure and interlock. The steps of the test procedure and the action of the tester and its probe are best understood by reference to the descriptions of the flow chart in FIGS. 7, 7A, 7B, 7C and 7D and an exemplary mechanism in FIGS. 12–15.

In this sixth system, if the probe does not deploy then the guard and interlock cannot be tested, therefore the interlock function will be reinstated by removing the bypass to restore its protective function and the necessary repair and/or replacement will be scheduled. If the probe does deploy and the guard closure is open or has opened as determined by the amount of probe movement, it is recorded that the guard closure failed the probe test; if it did not open it is recorded that the guard closure passed the probe test. The program controller will then test to see if the interlock changed to the "guard open" state due to the action of the tester probe and it is determined if the interlock passed or failed this test and the outcome is recorded. The tester probe is then retracted and if the probe did or did not retract will be ascertained and it will be recorded and indicated whether the interlock passed or failed the retraction test. If the guard closure, interlock and probe passed all the tests the interlock fiction will be reinstated by removing its bypass to restore its protective functions and the "test passed" indicators will be activated. If all tests did not pass, the controller will activate the "tests failed" warning indicators and devices and shut down the machine or not as desired. If the machine is shut down the interlock function will be reinstated to restore its protective function and the "tests on" indicators deactivated. If it is elected to not shut down the machine the interlock will remain in the bypass mode and allow the machine to continue to operate and to schedule the necessary repair or replacements for a future time.

It remains to note that the novel systems illustrated and disclosed herein are employed as part of a main routine FIGS. 8A, 8B, 8C and 8D that controls the running of a machine and also directs the testing of its guard closures and interlocks. The testing in question is done without shutting down the machine. This main routine is similar to that described in FIG. 2 for testing interlocks only of the referenced U.S. Pat. No. 5,870,317.

In addition to the various systems discussed above that can be used to test the guard closure either separately or in conjunction with interlocks it may be required to determine whether or not the machine has come to a complete stop before guard locks are allowed to unlatch and the guards are allowed to be opened. In such a situation it is usual to employ run down completion detection devices such as motion detectors, zero speed switches or detectors, timing devices, delay devices, interference's devices and motion blockers to make a final check if the machine has in fact come to a complete stop. Timing and delay devices are often used to assure that run down has resulted in zero motion by withholding a latch opening signal until the "worst case" or longest drift time has elapsed plus a safety factor. For machines that have a very broad range of stopping times, the "worst case" time may unduly compromise their utility. Here, it is often advantageous to use motion detectors and zero speed indicators to determine when machine components have come to rest. As a check on the veracity of zero motion devices, interference or motion blocking devices may be deployed before operators are allowed to open guard closures. Such devices may be as simple as setting a "dog into a gear" or a "stick into wheel spokes".

BRIEF DESCRIPTION OF THE DRAWINGS

In the following drawings there will be a number of illustrations of systems for testing guards with or without interlocks as well as several mechanisms employed in such systems.

FIGS. 2, 2A, and 2B illustrate a flow diagram of a subroutine for testing closures not protected by interlocks;

FIGS. 3, 3A, 3B, 3C and 3D illustrate a flow diagram of a subroutine for testing interlocks of guards equipped with integral interlock-lock devices;

FIGS. 4, 4A, 4B, 4C and 4D illustrate a flow diagram of a guard closure test subroutine for closures protected by interlocks;

FIGS. 5a, 5a-1, 5a-2, 5a-3, 5a-4 and 5b illustrate a flow diagram of a subroutine for the sequential testing of interlocks and closures;

FIGS. 6a, 6a-1, 6a-2, 6a-3, 6a-4, 6b, 6b-1, 6b-2 and 6b-3 illustrate a flow diagram of a subroutine for the sequential testing of interlocks and closures including an integral interlock-locking device;

FIGS. 7, 7A, 7B, 7C and 7D illustrate a flow diagram of a subroutine for the simultaneously testing of both the closure and an interlock with the same tester;

FIGS. 8, 8A, 8B, 8C and 8D illustrate an example of a main routine for testing interlocks and guard closures;

DESCRIPTION OF THE PREFERRED EMBODIMENTS

Figure 1:
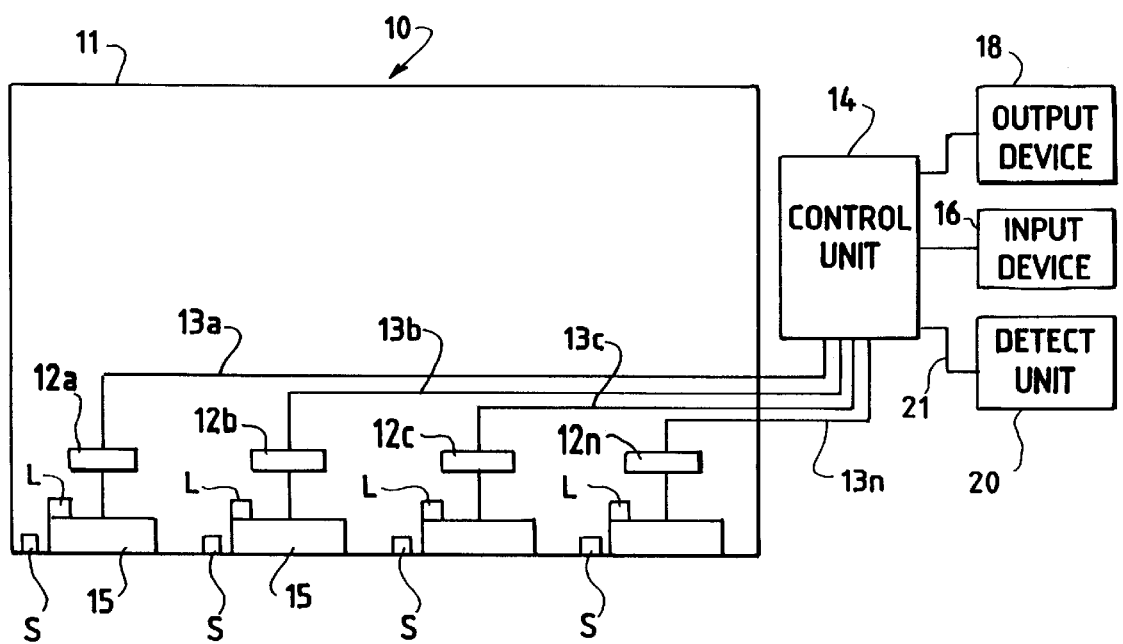
FIG. 1 is schematic view of an automatic guard closure and interlock testing system.

Referring first to FIG. 1 the testing system 10 preferably includes one or more machines 11 (one being shown), a control unit 14, an input device 16, and an output device 18. The system 10 may also include one or more detection units (one being shown) such as, for example, flow sensors, proximity sensors, heat detecting devices, to detect certain operating conditions of the system 10. The detection units 20 of the system 10 may communicate with the control unit 14 by transmission line or any other suitable communication link. It will be recognized that the control unit 14, the input device 16, and output device 18 may be integral with the machine 11 or remote from the machine 11.

The schematic illustration of the machine 11 pictures an arrangement wherein each guard 15 can be protected by an interlock 12a, 12b etc. Each interlock has a switch and may be in communication with or coupled to the control unit by transmission lines 13a, 13b etc. respectively. The transmission lines may be one-way on bi-directional communication links of any suitable type.

The system can employ an integral locking mechanism L or a separate locking device S schematically shown mounted on each guard in FIG. 1 can be provided if desired. Similarly, while interlocks are shown in conjunction with guard closures a number of the closures may not be protected by interlocks. Thus the testing system is not intended to limit the application of applicants invention and is merely intended to provide a general overview of systems that can be employed.

The control unit can be set to test the guards and/or interlocks on any specified schedule, for instance, during each shift, hourly, daily, weekly, or any other interval. A signal or warning indicator, such as a light or flag, can be placed wherever desired, for instance, adjacent to each guard, and be suitably activated in the event the guard and/or interlock fails, to warn personnel of this condition.

In FIG. 1, the input device 16 of the system 10 is in communication with or coupled to the control unit 14. The input device 16 may include a keyboard, a keypad, or any other suitable input device 16. The input device 16 may allow a number of versatile control or scanning functions to be utilized. For example, the guards and interlocks may be continuously monitored or checked at a preselected time. Alternatively, the frequency and duration of monitoring all or a selected number of guards and interlocks may be initially preset and/or changed.

The output device 18 of the system 10 is also in communication with or coupled to the control unit 14. The output device 18 may generate a message or an alarm that can be visual, audio, or whatever else is suitable, singly or in combination, when a malfunctioning guard or interlock is detected. The output device 18 may include a display or monitoring panel that may alert an operator that a trouble or an alarm condition exists and may also indicate the location of the malfunctioning interlock in the environment.

The output device 18 may further display a message to identify what is being tested and where, what is bypassed for testing and what is not, etc. and the corrective action required. The output device 18 may be designed at any level of sophistication or complexity in order to process the information about the status of the guards and interlocks and to indicate that a problem exists with one or more guards or interlocks.

The control unit 14 of the system 10 checks the functioning or operation of one or more guards or interlocks as well as other machine controls. The control unit 14 may include, for example, a program unit, a processing unit, a computer, a programmable logic controller, a microprocessor, etc. The control unit 14 can be commanded with any suitable operating system, and can be digital, analog, hardwired, etc., or combinations of these. The control unit 14 can be commanded to continuously monitor the guards and interlocks and test them in any sequence combination at a preselected schedule, frequency, duration, or randomly.

When the control unit 14 detects a malfunctioning guard or interlock, a light and/or any other suitable alarms may be activated at the output device 18 and/or near the interlock, and the control unit 14 may place the guard or interlock in a maintenance standby mode as further described below. A message indicating a malfunctioning guard or interlock may also be displayed on the output device 18. The particular location of the guard or interlock of the machine 11 may further be identified.

We turn now to the subroutines used for testing guards and or interlocks. FIGS. 2–8 illustrates test routines executed by the program controller unit to test; A) individual guard closures; B) interlocks of guards equipped with integral interlock-locking devices C) guards protected by interlocks; D) guards protected by interlocks wherein there is sequential testing of first the interlock and then the guard; E) guards protected by integral interlock-lock devices whereby there is sequential testing of the interlock then the guard; F) testing of guards protected by interlocks calling for simultaneous testing of the guard closure and the interlock with the same testing device and G) an example of a main routine for the testing of interlocks and guard closures. The interlock and guard test routines may be implemented by conventional hardware components and circuit designs, computer programming, and combinations thereof. Exemplary flow chart diagrams are described below, but it is understood that these are merely for the purposes of illustration implementation that will carry out the functions of the process.

Interlock testers, testing systems and methods of testing have been extensively detailed in U.S. Pat. No. 5,870,317 entitled Remote and Proximal Interlock Testing Mechanisms and Testing Systems filed in names of the present inventors and assigned to the same assignee Triodyne Inc. as the present invention. All interlock testing referred to here can be executed and accomplished by such testers, methods and systems.

Figure 2A:
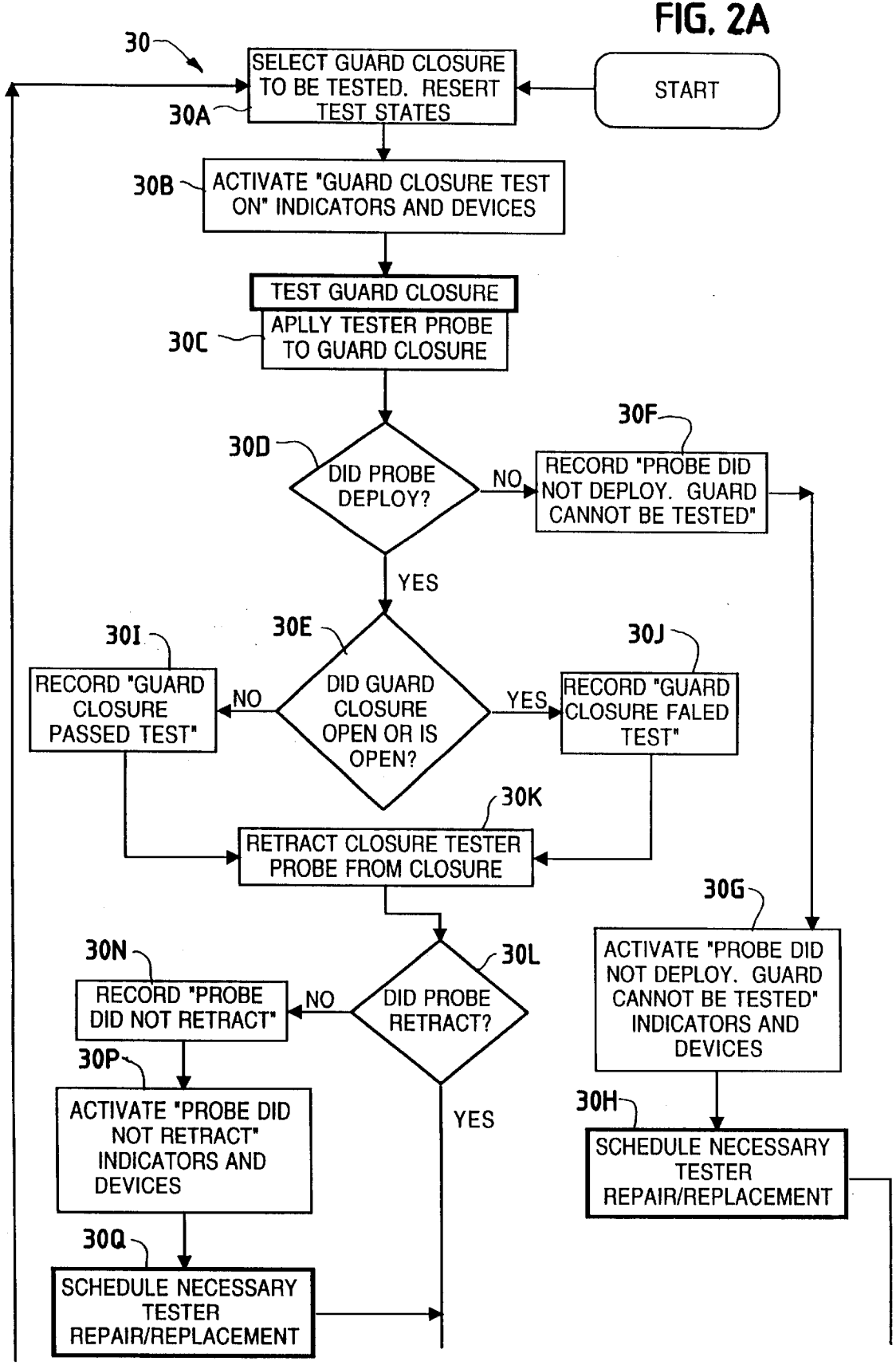
Figures 1, 5A:
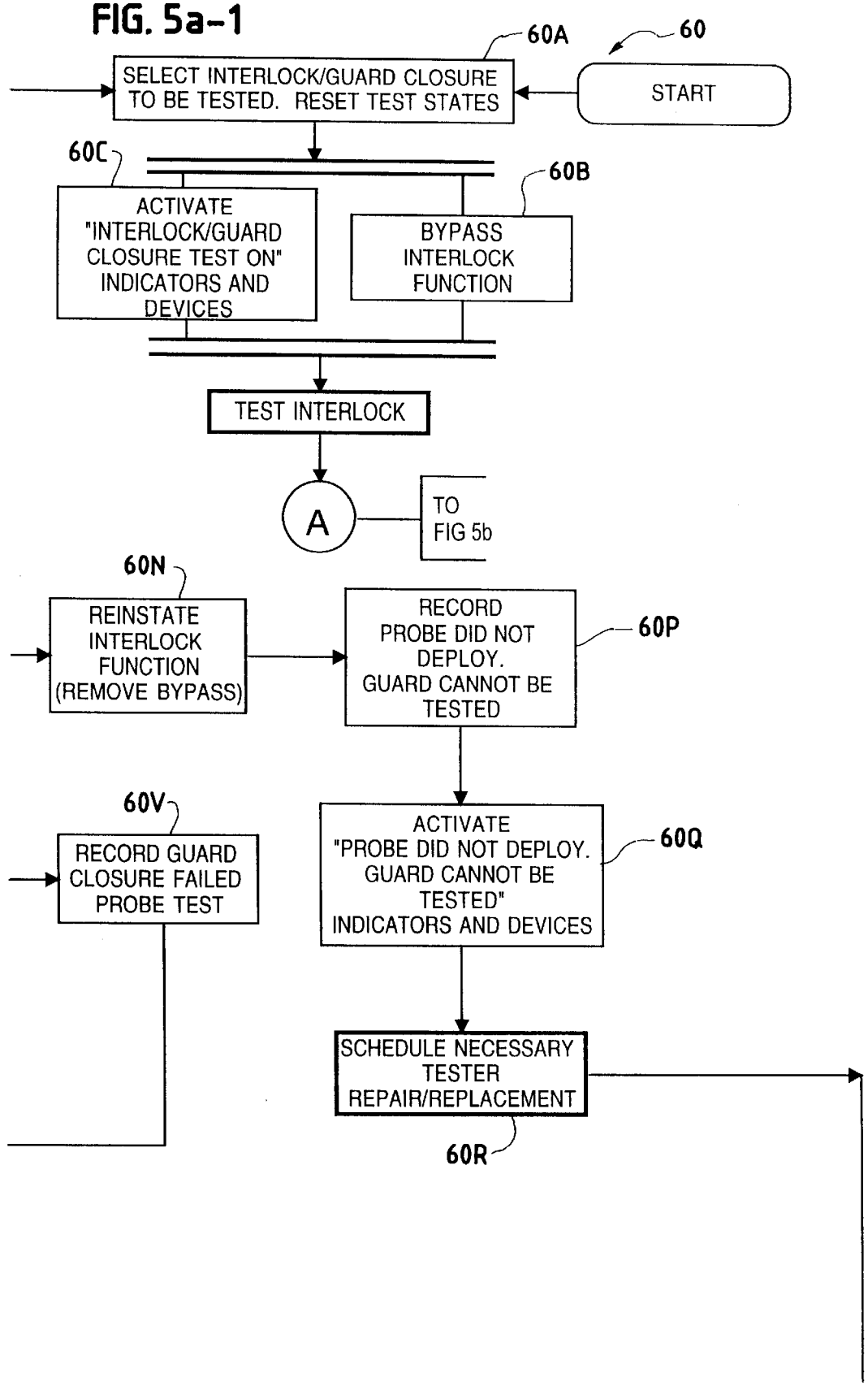
Figures 2, 5A:
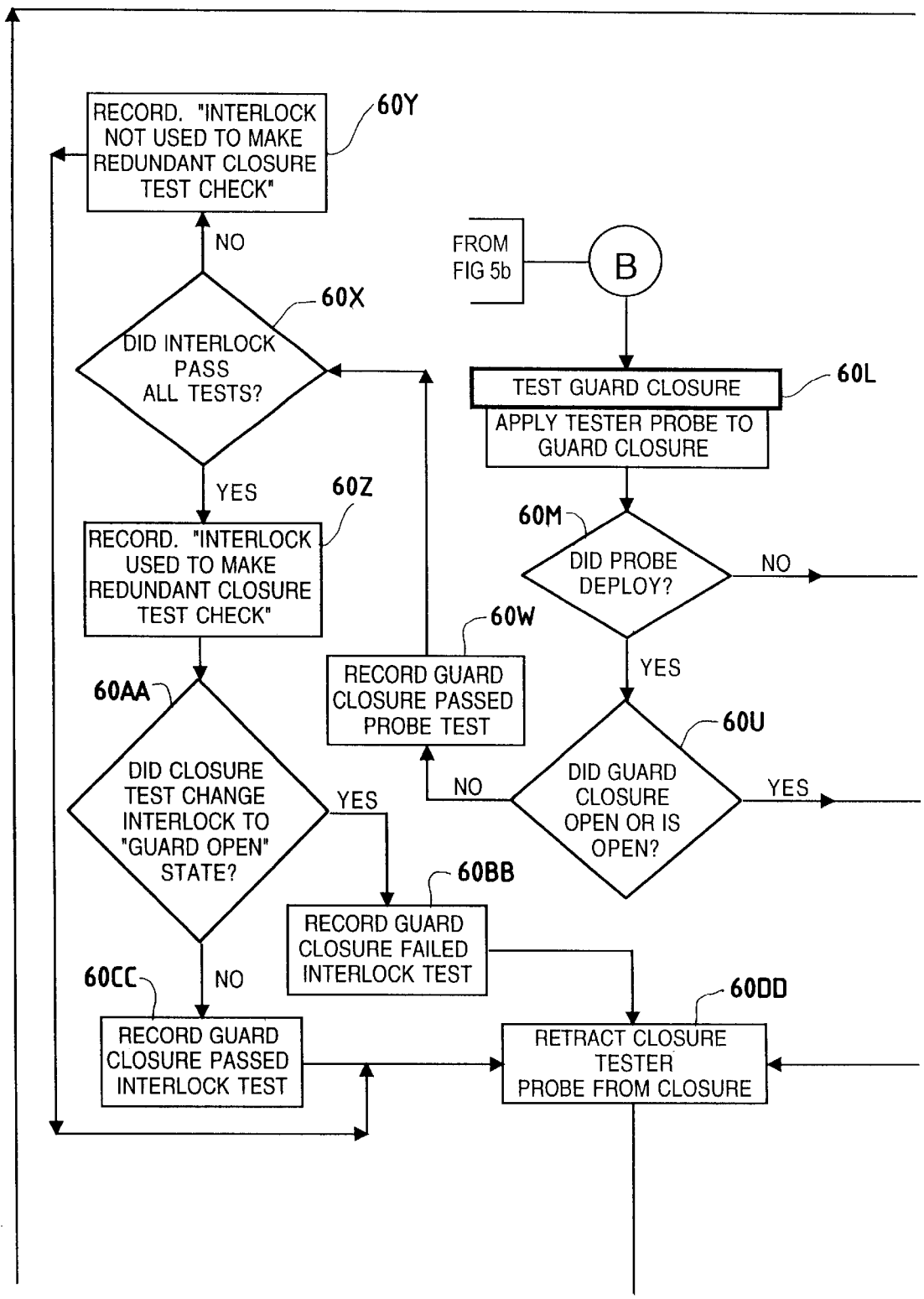
Figures 3, 5A:
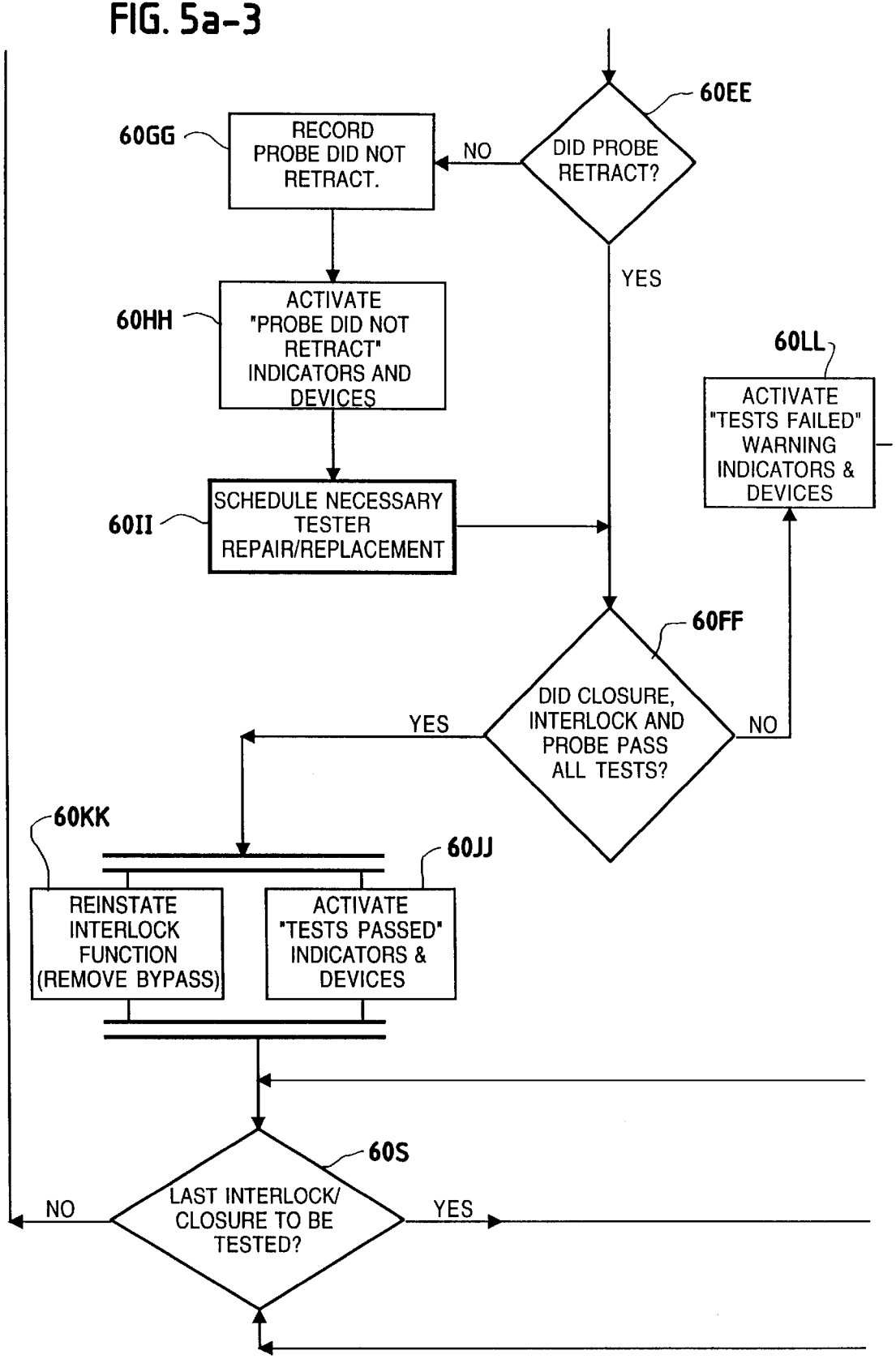
Figures 4, 5A:
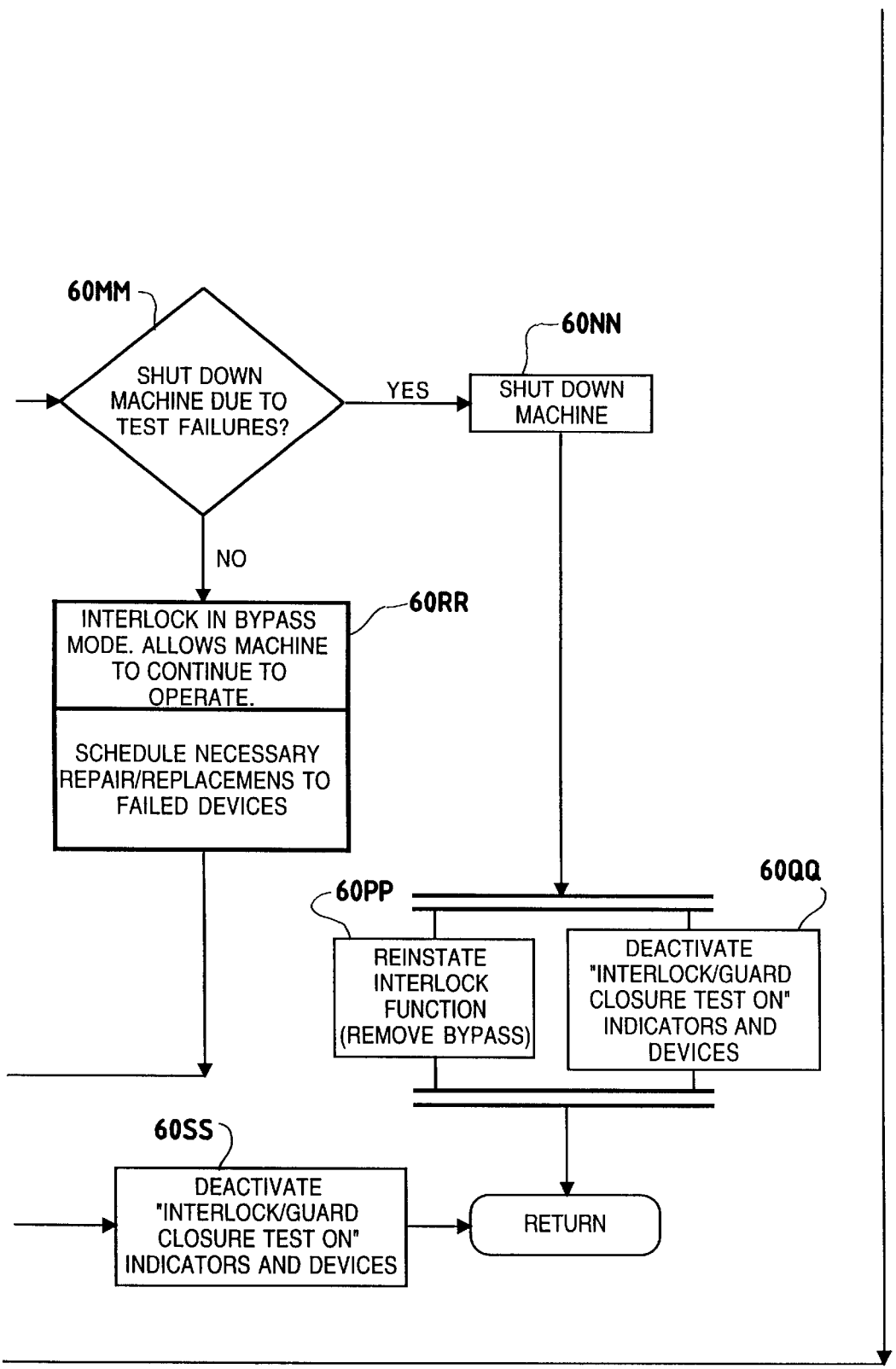

Starting with FIGS. 2A and 2 B there is shown a subroutine to test a guard closure that is not protected by interlocks. The subroutine is designated by the number 30 and is started by selecting a guard closure to be tested wherein the memory location storing the test states of the closure is reset at 30A. At 30B the guard closure "test on" indicators and devices are activated. To test the position of the guard closure a tester probe is applied to the guard closure at 30C and at 30D a determination is made whether the probe deployed, and if it deploys does it open the guard closure or indicates that the guard closure is open at 30E. If the probe did not deploy it will be so recorded at 30F. At 30G the indicators will show that the probe did not deploy and the guard cannot be tested and the necessary repair and/or replacement will be scheduled at 30H.

Returning now to the indicator 30E where if the guard closure opened or is open then at 30J it will be recorded that the guard closure failed the test. If the guard did not open then at 30I it is recorded that the guard closure passed the test. Following the test the closure tester probe is commanded to retract from the closure at 30K. From there it will be determined at 30L if the probe retracted, and if it retracted it will be determined at 30M whether the closure and probe passed all the tests. If the probe did not retract this will be recorded at 30N and at 30P indicators will show that the probe did not retract. At 30Q the necessary tester repairing and/or replacement will be scheduled. Returning now to 30M wherein it is determined if the closure and probe did or did not pass all the tests there are two possible results. If they did not pass all the tests, the test failed warning indicating devices are activated at 30R and at 30S it will be determined whether the machine is to be shut down or not due to the test failures. If yes, the machine is shut down at 30T and if the machine is not to be shut down at 30U the necessary repair and/or replacements are scheduled. If the machine is shut down the guard closure test indicator devices will be deactivated at 30V after which there is a return to the main routine shown in FIGS. 8A, 8B, 8C and 8D. The main routine is described in detail hereinafter. If the path is from 30U to 30W and if it is the last guard closure to be tested as indicated at 30W the system is then deactivated at 30X and returns to the main routine but if not the testing process will be started over again at a new guard closure. If the closure and probe passed all the tests it will be indicated at 30Y.

We, next go to FIGS. 3A, 3B, 3C and 3D which schematically illustrates the testing of interlocks of guards equipped with integral interlock-locking devices.

The integral interlock-lock is typically a device which houses both the interlock and the guard lock in a combined housing. The mechanical testing of the interlock for such a coupled device requires the unlatching of its lock from the guard before the interlock testing can be executed. This test subroutine 40 has the option of shutting down the machine due to test failures or put the interlock and/or lock in a bypass mode thus allowing the machine to continue to operate and subsequently test other interlock-locking devices if desired. It will also indicate and/or schedule the necessary repair or replacement of the failed devices.

Referring now in detail to the FIGS. 3A, 3B, 3C and 3D flow chart when this subroutine 40 is initiated the memory location storing the test states of the interlock and lock to be tested is reset at block 40A. It will be recognized that the memory location for a single interlock-lock device may be reset or the memory location for all interlock-lock devices may be reset. Next the system is set to bypass the lock function at 40B, bypass the interlock function at 40C and activate the "test on" indicators and devices at 40D. The next step is to unlatch the lock at 40E and if the lock did unlatch (change state) at 40F the interlock tester at 40G will change the interlock to the "guard open position" and test it. If the lock did not unlatch this will be recorded at 40H and indicate that the interlock can not be tested and the lock and interlock functions will be reinstated at 40I. Indicators will be activated at 40J to inform that the lock did not unlatch and that the interlock can not be tested. Scheduling of necessary lock repair and/or replacement will be signaled at 40K.

Returning now to 40G where the interlock was changed to the "guard open" position and tested we will move to 40L which will indicate whether or not the interlock changed to the guard open state. If it did not at 40M it will be recorded that the interlock failed the test. If the interlock passed the test 40N will record this occurrence. The interlock tester restores the interlock to the "guard closed" position where it is tested at 40U. At 40V it is determined if the interlock it returned to the "guard closed state". If not it will record that the interlock failed the test at 40W and if it passed the test a record is made at 40X. In both instances the system proceeds to 40P where the lock will be commanded to be relatched and tested. At 40Q there will be a test to determine if the lock did change its state and thus relatched. At 40R it will record if the lock failed the test and if the lock relatched it will be recorded at 40S and the lock function will be reinstated at 40T by removing the bypass. If the interlock and lock passed all the tests as indicated at 40Y the interlock function will be reinstated by removing its bypass at 40Z and the "test passed" indicator and devices will be activated at 40AA. If the interlock and lock did not pass all the tests, the test failed warning indicator devices will be activated at 40BB and then one may choose to shut down the machine due to test as failures indicated at 40CC by shutting down the machine at 40DD. The machine shut down is followed by the reinstating of the bypassed functions at 40HH and by the deactivation of the "tests on" indicators and devices at 40II. If the choice at 40CC is that one does not want the machine to shut down then at 40EE the interlock and/or lock will be left in the bypass mode allowing the machine to continue to operate and schedule necessary repair or replacement of the failed devices. If it is the last interlock tested as indicated at 40FF the test and indicators will be deactivated at 40GG which returns the system to the main routine. If additional interlocks/locking devices are to be tested the routine returns to 40A and starts the testing again for another interlock-lock device.

In FIGS. 4A, 4B, 4C and 4D there is illustrated a guard closure test subroutine for closures that are protected by interlocks. The subroutine is designated by the number 50. In starting the system, the memory for the guard closures to be tested is reset to the proper test states at 50A. Following this the interlock function is bypassed at 50B and the guard closure test indicators and devices are activated at 50C. The guard closure is then tested at 50D by applying a tester probe to the guard closure. At 50E it is determined whether or not the probe deployed. If the probe did not deploy the interlock function will be reinstated by removing the bypass and at 50F and it is recorded at 50G that the probe did not deploy and the guard cannot be tested. At 50H activated indicators will be showing that the probe did not deploy and that the guard cannot be tested, following which at 50J the necessary tester repair and/or replacement will be scheduled.

Returning to the indicator 50E, if the tester indicates that the probe did deploy the next test is at 50K where it is determined if the guard closure did open or is opened by the probe. If the closure did open or is opened 50L will record that the guard closure failed the probe test. If the guard closure is not open and did not open 50M will record that the guard closure passed the test. The next step is to use the interlock to make a redundant closure test check. At 50P there will be an indication as to whether or not the interlock is known not to be faulty and if the interlock is not known not to be faulty 50Q will indicate that the interlock is not to be used to make a redundant closure test check. If the interlock is known not to be faulty the interlock is used to make a redundant closure test check at 50R. The interlock state is then determined at 50S. If the closure test changed the interlock to the "guard open" state, 50T will indicate that the guard closure failed the redundant interlock check test. If at 50S the interlock did not change to the "guard open" state 50U will indicate that the guard passed the redundant interlock closure test. The paths from 50U, 50Q, 50T and 50L all lead to 50V where the closure tester probe is commanded to retract from the closure and its retraction status is tested at 50W. If 50W indicated that the probe did retract then at 50X it will be determined that the closure and probe passed all tests. If the probe did not retract it will be recorded that the probe did not retract at 50Y and the indicators at 50Z will show that the probe did not retract and the necessary tester repair and/or replacement will be scheduled at 50AA.

If the closure and probe did pass all the tests at 50X the "test passed" indicators and devices are activated at 50BB and the interlock function is reinstated at 50CC by removing the bypass. If the closure and probe did not pass all of the tests the test failed warning indicators and devices will be activated at 50DD and a selection at 50EE will be made to shut down the machine due to test failures by shutting down the machine at 50FF or choose not to shut down the machine and put the interlock in the bypass mode at 50GG to allow the machine to continue to operate and schedule necessary replacements of the failed devices. If it is the last closure to be tested as indicated at 50HH the guard closure test indicators and devices will be deactivated at 50II and the system returns to the main routine. If at 50HH it is determined that it is not the last guard closure to be tested, then the testing process will start all over with the next scheduled guard closure by returning to 50A. If the machine is shut down at 50FF, then it is followed by the reinstating of the bypassed interlock function at 50LL and by the deactivation of the "guard closure test on" indicators and devices at 50MM.

Figure 5B:
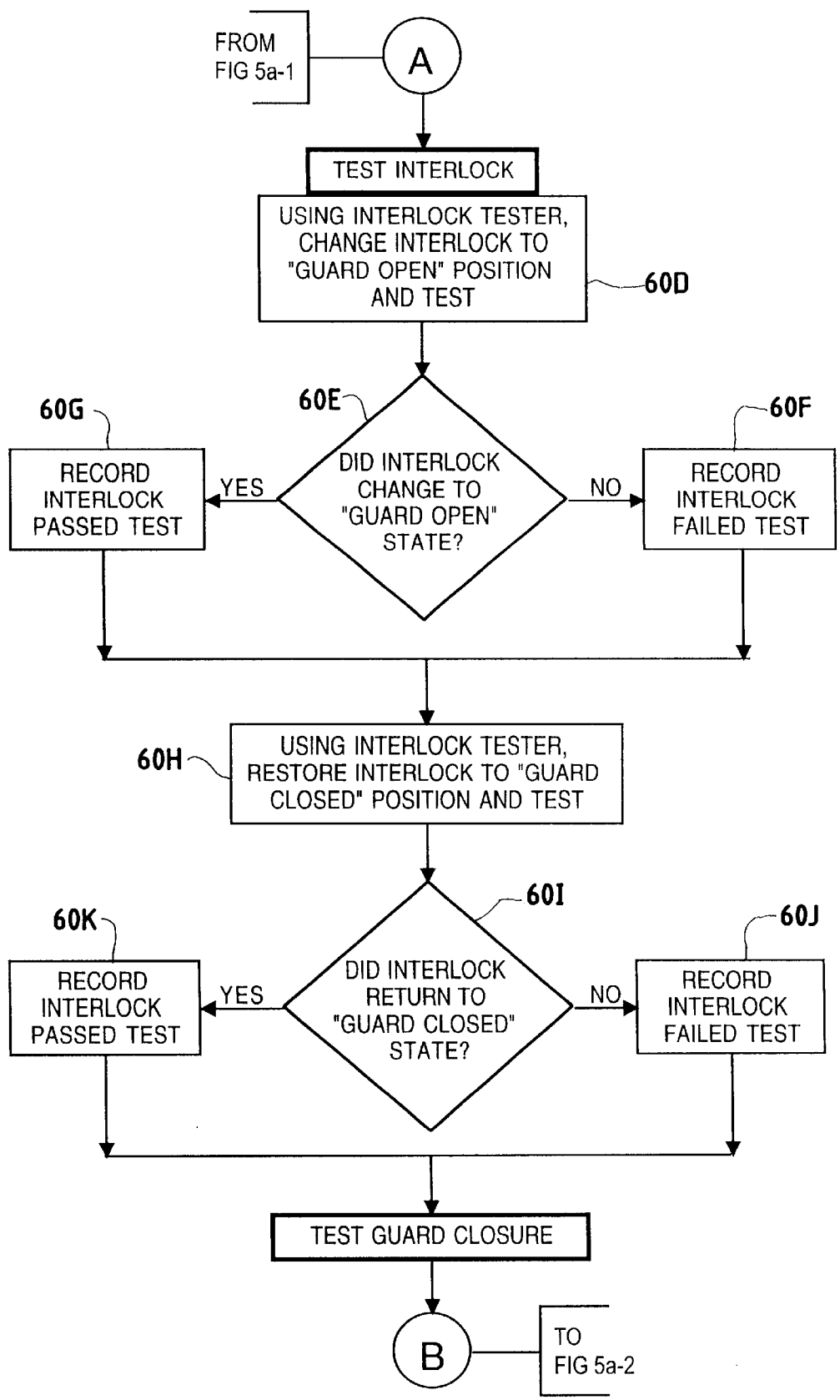

In FIGS. 5a-1, 5a-2, 5a-3, 5a-4 and 5b there is illustrated a guard closure test subroutine 60 for closures protected by interlocks wherein there is sequential testing of first the interlock and then the closure. When starting the system the memory for the interlock/guard closure to be tested is reset to the proper states at 60A. Following this the interlock function is bypassed at 60B and the "interlock/guard closure tests on" indicators and devices are activated at 60C. The next step is to test the interlock which is shown in FIG. 5b wherein at 60D the interlock tester is used to change the interlock to the "guard open" position. At 60E it will be determined if the interlock did change to the "guard open" state and if it did not it will be recorded that the interlock failed the test at 60F or that it passed at 60G. Then at 60H the interlock tester acts to restore the interlock to the "guard closed" position and tests it. At 60I it will indicate whether or not the interlock returned to the "guard closed" state. If it did not, a record that it failed the interlock test will be made at 60J or that the interlock passed the test at 60K.

Following this, the guard closure is to be tested and reference is now made again to FIG. 5a-2 wherein at 60L the guard closure is tested by applying a tester probe to the guard closure. At 60M it is determined whether or not the probe deployed. If the probe did not deploy the interlock function will be reinstated by removing the bypass at 60N and at 60P it is recorded that the probe did not deploy and the guard cannot be tested. At 60Q activated indicators will reflect that the probe did not deploy and that the guard cannot be tested. Following at 60R the necessary tester repair and/or replacement will be scheduled and the program controller will index to test the next interlock/closure at 60S.

Returning now to 60M where if it has been indicated that the probe did deploy, the next test is at 60U where it is determined if the guard closure did open or is opened by the probe. If the closure did open or is opened which should not have been the case 60V will record that the guard closure failed the probe test. If the guard closure is not and did not open 60W will record that the guard closure passed the test. The next step is to use the interlock to make a redundant closure test check. At 60X there will be an indication as to whether or not the interlock passed the test and if it did not 60Y will record that the interlock is not to be used to make a redundant closure test check. If the interlock did pass the test the interlock is used to make the redundant closure test check at 60Z and at 60AA it will be tested to see if the interlock changed to a "guard open" state. If the closure test changed the interlock to the "guard open state" 60BB will indicate that the guard closure failed the interlock test. If at 60AA the interlock did not change to the "guard open" state, 60CC will indicate that the guard closure passed the interlock test. The paths from 60CC, 60Y, 60BB, and 60V all lead to 60DD where the closure tester probe is commanded to retract from the closure as indicated at 60DD and its retraction status is determined at 60EE. If 60EE indicates that the probe retracted, then at 60FF it will be determined if the closure, interlock and probe did or did not pass all tests. If the probe did not retract it is recorded that the probe did not retract at 60GG and indicators at 60HH will show that the probe did not retract and the necessary test repair and/or replacement will be scheduled at 60II. The process then proceeds to 60FF.

If the closure and probe did pass all the tests at 60FF, test passed indicators and devices are activated at 60JJ and the interlock function is reinstated at 60KK by removing the bypass. If the closure and probe did not pass all of the tests the "test failed" warning indicators and devices will be activated at 60LL. Subsequently, a selection can be made at 60NN to shut down the machine due to test failures by shutting down the machine at 60NN. After shutting down the machine the interlock function will be reinstated at 60PP and testing is deactivated at 60QQ and the process returns to the main routine shown in FIGS. 8A, 8B, 8C and 8D. If the choice is made not to shut down the machine the interlock is put in the bypass mode at 60RR to allow the machine to continue operating and schedule necessary replacements of the failed device. If it is the last closure to be tested as indicated at 60S the interlock/guard closure test indicators will be deactivated at 60SS and the process returns to the main routine shown in FIGS. 8A, 8B, 8C and 8D. If not the process will be repeated for testing another closure protected by an interlock.

We turn now to an additional novel embodiment of applicant's invention as shown in FIGS. 6a-1, 6a-2, 6a-3, 6a-4, 6b-1, 6b-2 and 6b-3. Here the guard closure is protected by an integral interlock-lock, the testing of which was described in FIGS. 3A, 3B, 3C and 3D. When this subroutine 70 is initiated the memory location storing the test states of the interlock-guard closure to be tested is reset at 70A. It will be recognized that the memory location for a single location for a single interlock-lock may be reset or the memory location for all interlock-lock devices may be reset.

Initially, the system is set to bypass the lock function at 70B, bypass the interlock function at 70C and activate the "test on" indicators and devices at 70D.

Reference is now made to FIGS. 6b-1, 6b-2, and 6b-3 wherein a system is shown for testing the interlock which by way of reference is similar to FIGS. 3A, 3B, 3C and 3D. In this arrangement the first step is to unlatch the lock at 70E. If he lock did unlatch change state at 70F the interlock tester at 70G will be commanded to change the interlock to the "guard open position" and test it. If the lock did not unlatch this will be recorded at 70H and it will be indicated that the interlock cannot be tested. The lock and interlock functions will be reinstated at 70I and indicators will be activated at 70J to inform that the lock did not unlatch and thus the interlock cannot be tested. Scheduling of necessary lock repair and/or replacement will be signaled at 70K. Following this the guard closure is to be tested and reference is made to B on FIG. 6a-2.

However, as aforementioned this system provides for testing the interlock which is done if the lock did unlatch. To this end we return to 70G wherein the interlock tester is used to change the interlock to the "guard open" position and test for its change of state.

At 70L there would be an indication of whether or not the interlock changed to the guard open state and if it did not at 70M it will record that the interlock failed the test. If the interlock passed the test 70N will record this occurrence. The interlock tester restores the interlock to the "guard closed" position where it is tested at 70U. At 70V it is determined if the interlock returned to the "guard closed state". If it did not it will be recorded that the interlock failed the test at 70W and if it passed the test a record is made at 70X.

In either instance the system proceeds to 70P where the lock will be commanded to be relatched and tested. At 70Q there will be a test to determine if the lock did change its state and thus relatch. At 70R it will record if the lock failed the test. If the lock relatched it will be recorded at 70S that it passed the test and the lock function will be reinstated by removing the bypass at 70T.

Figures 1, 6A:
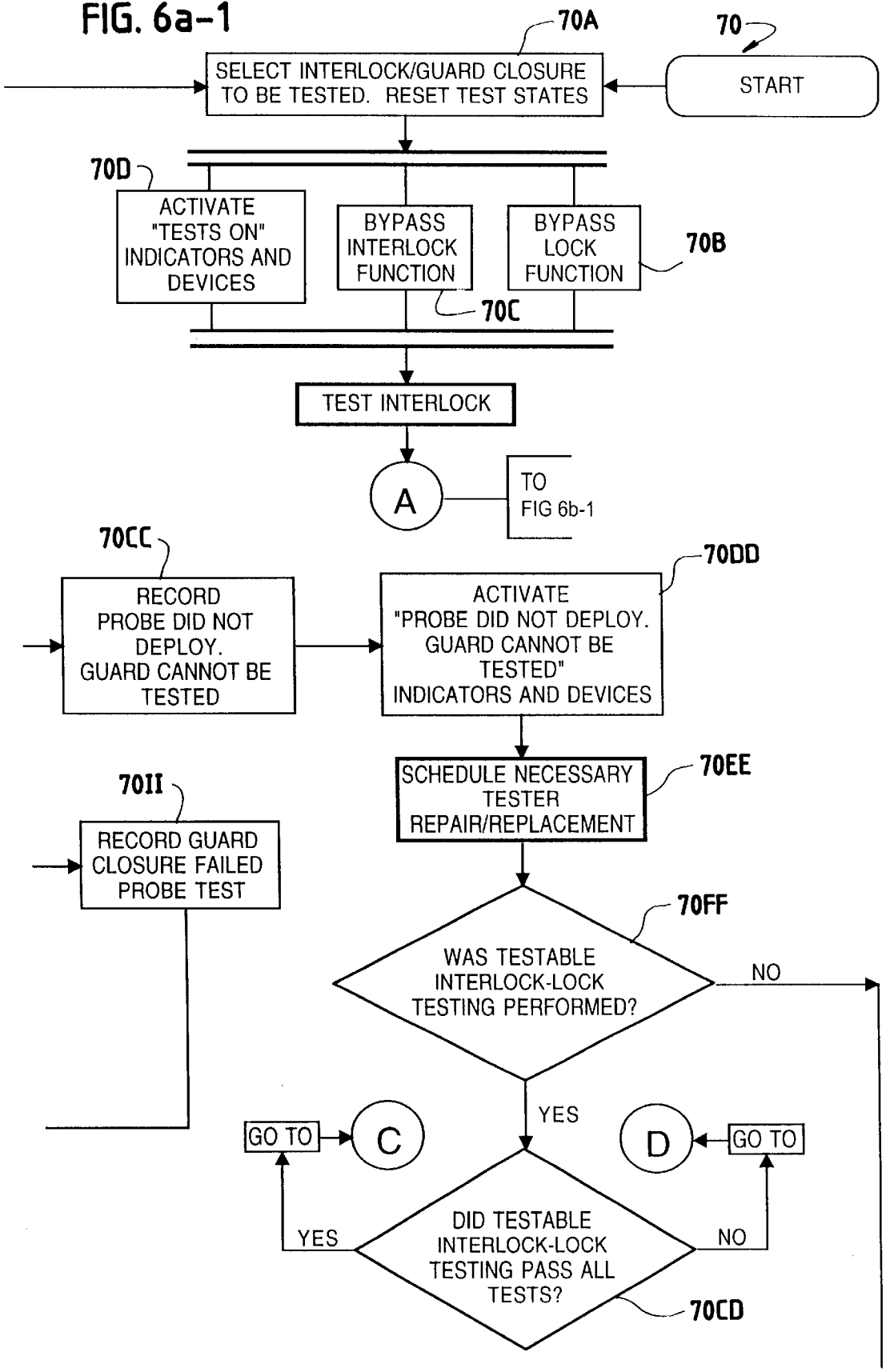
Figures 2, 6A:
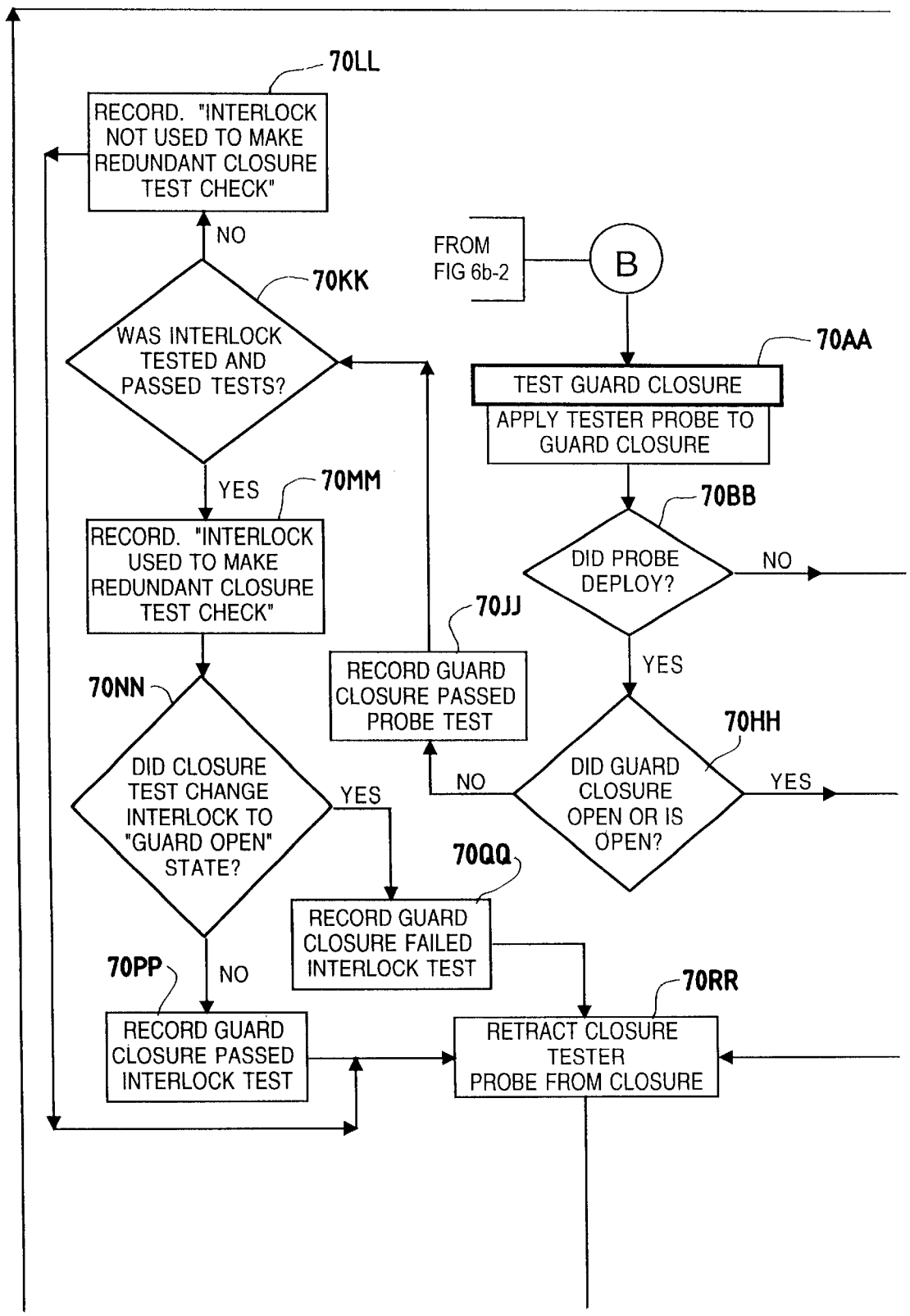
Figures 3, 6A:
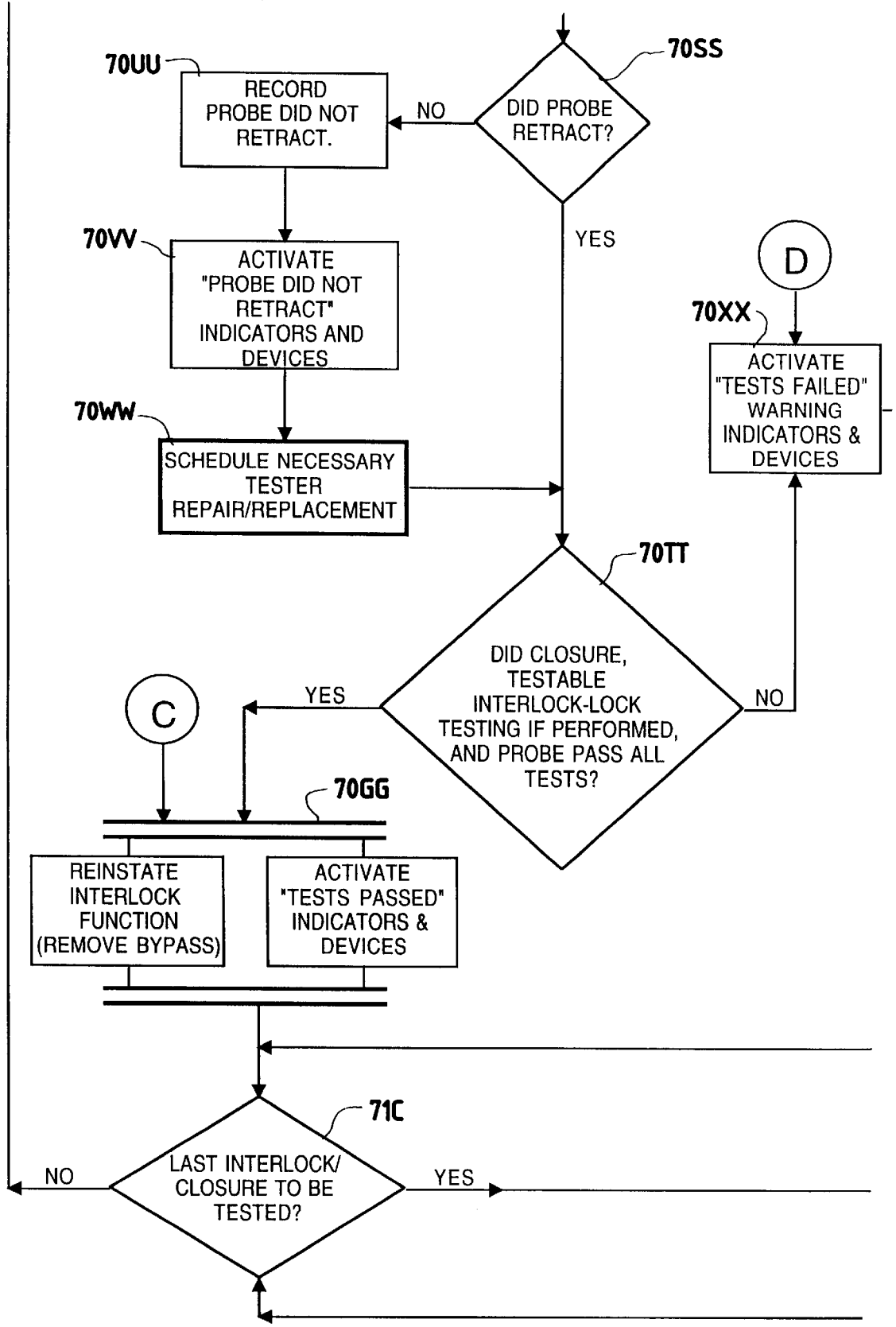
Figures 4, 6A:
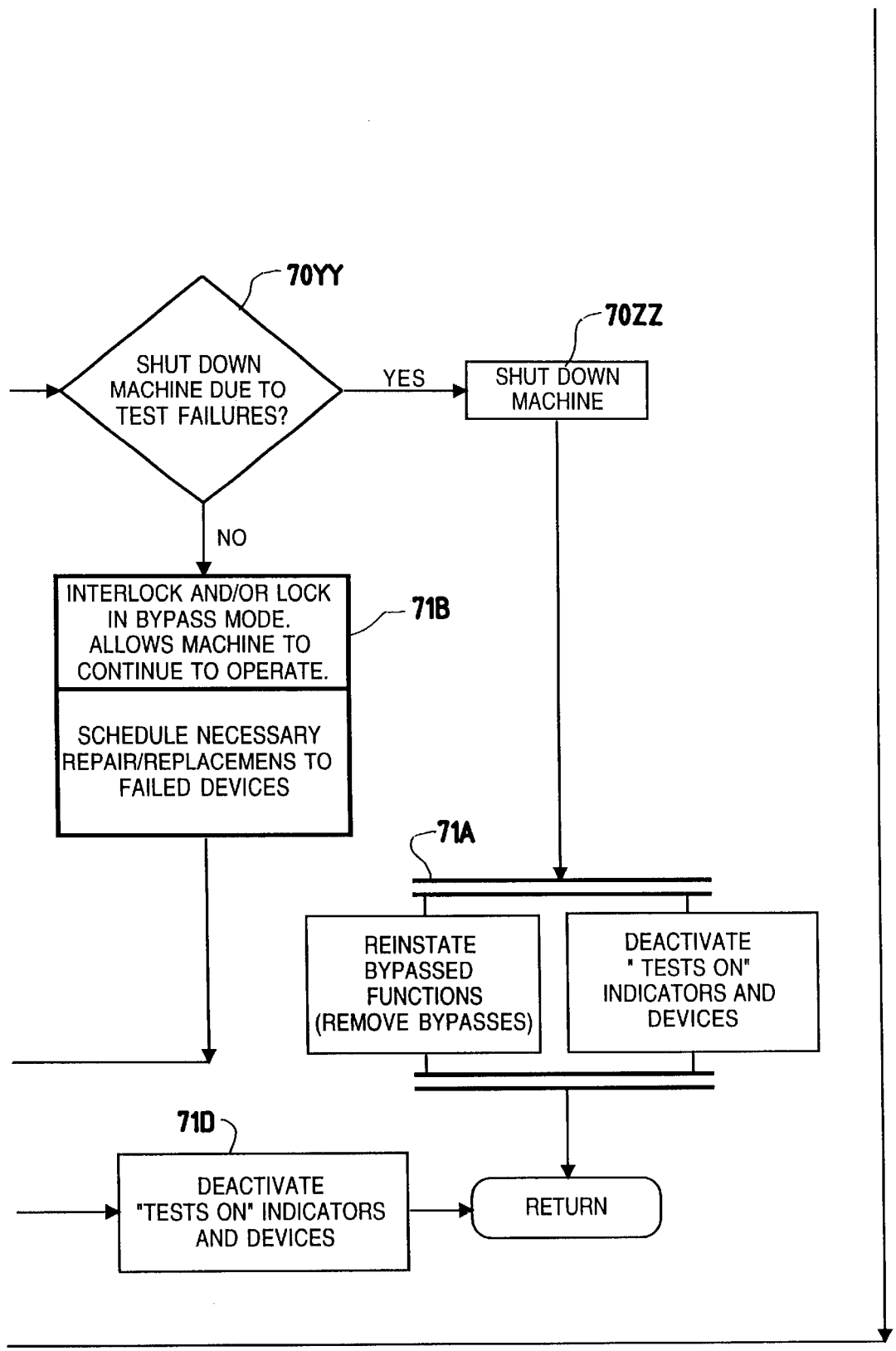
Figure 6B:
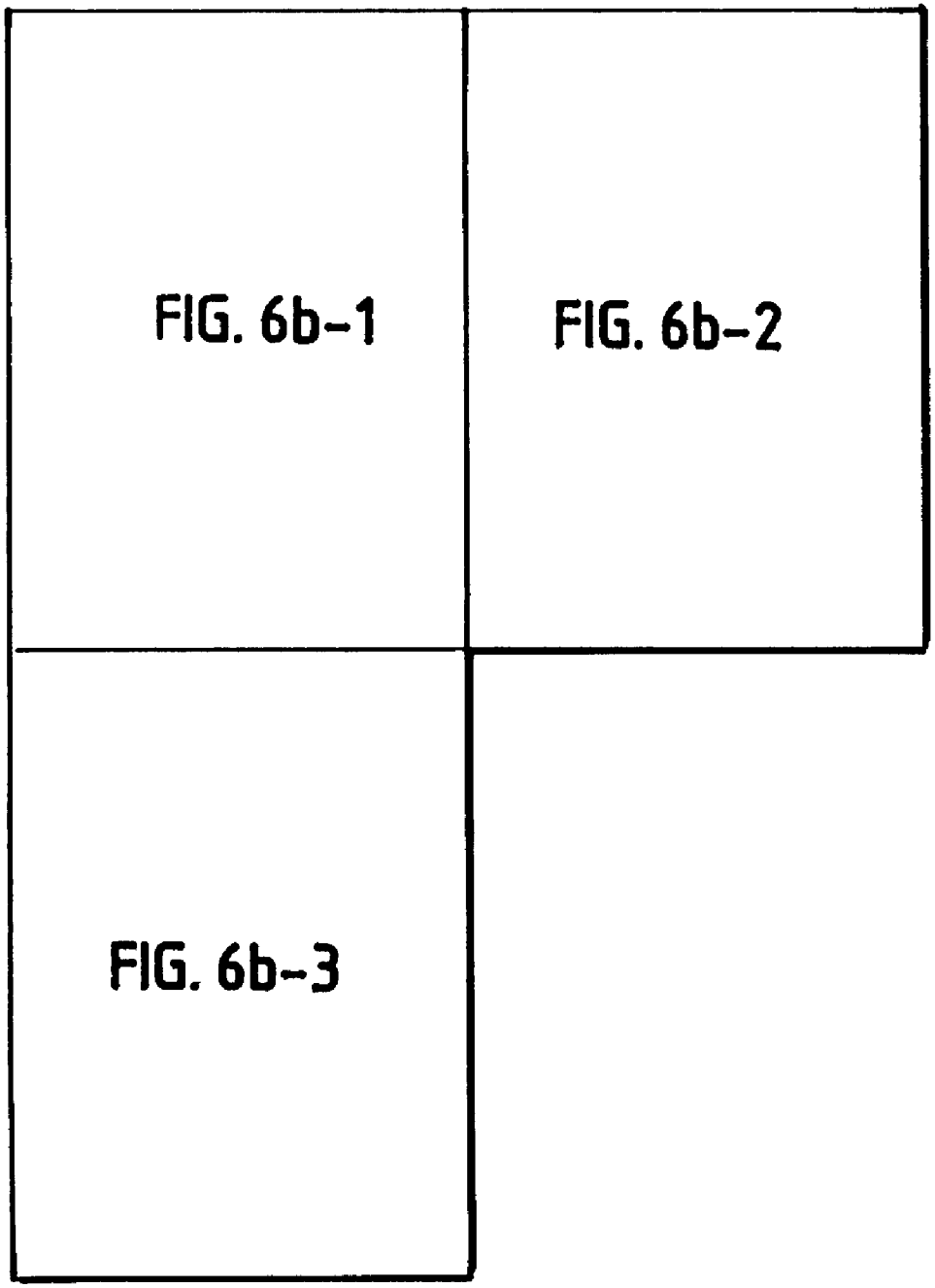
Figures 1, 6B:
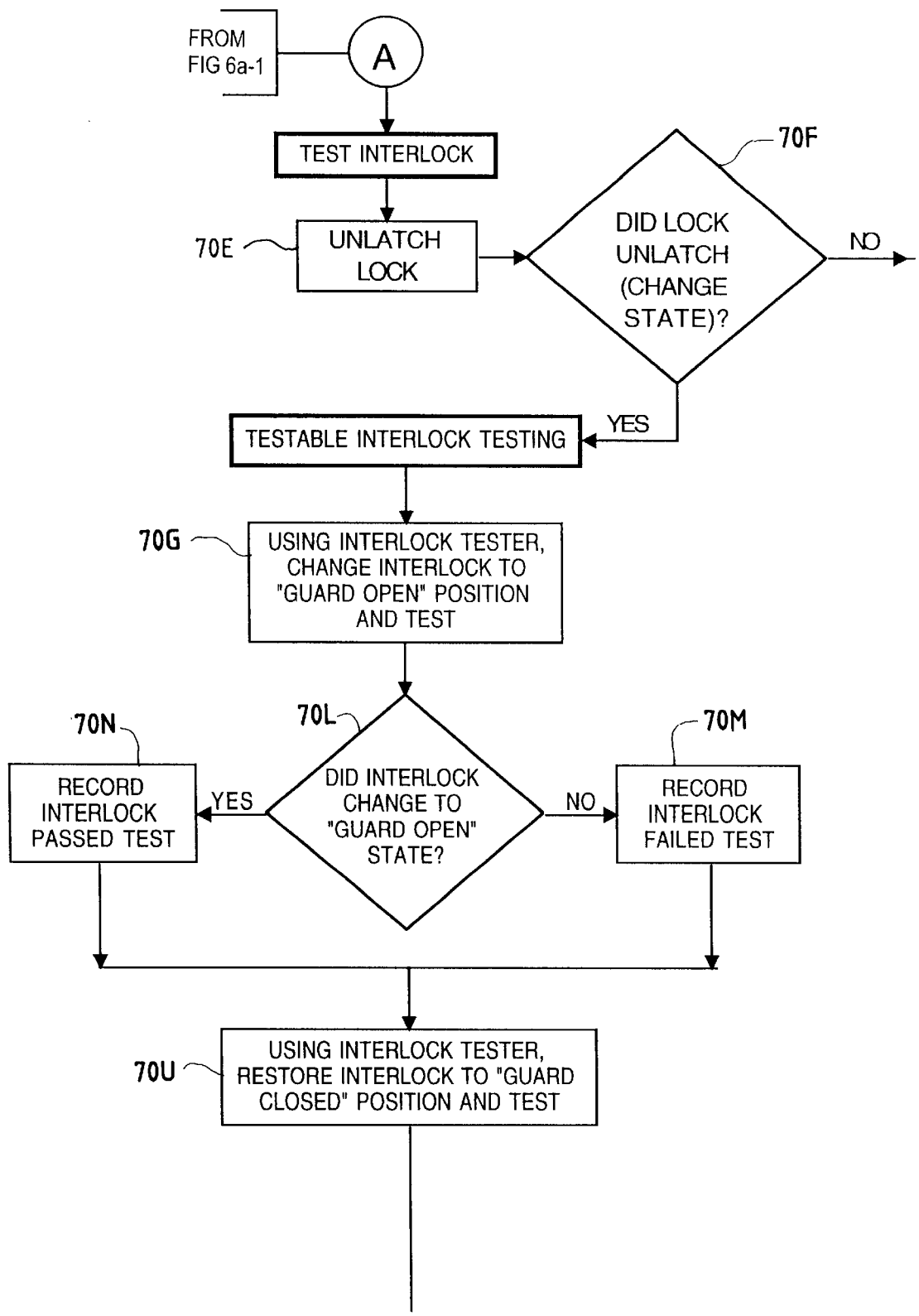
Figures 2, 6B:
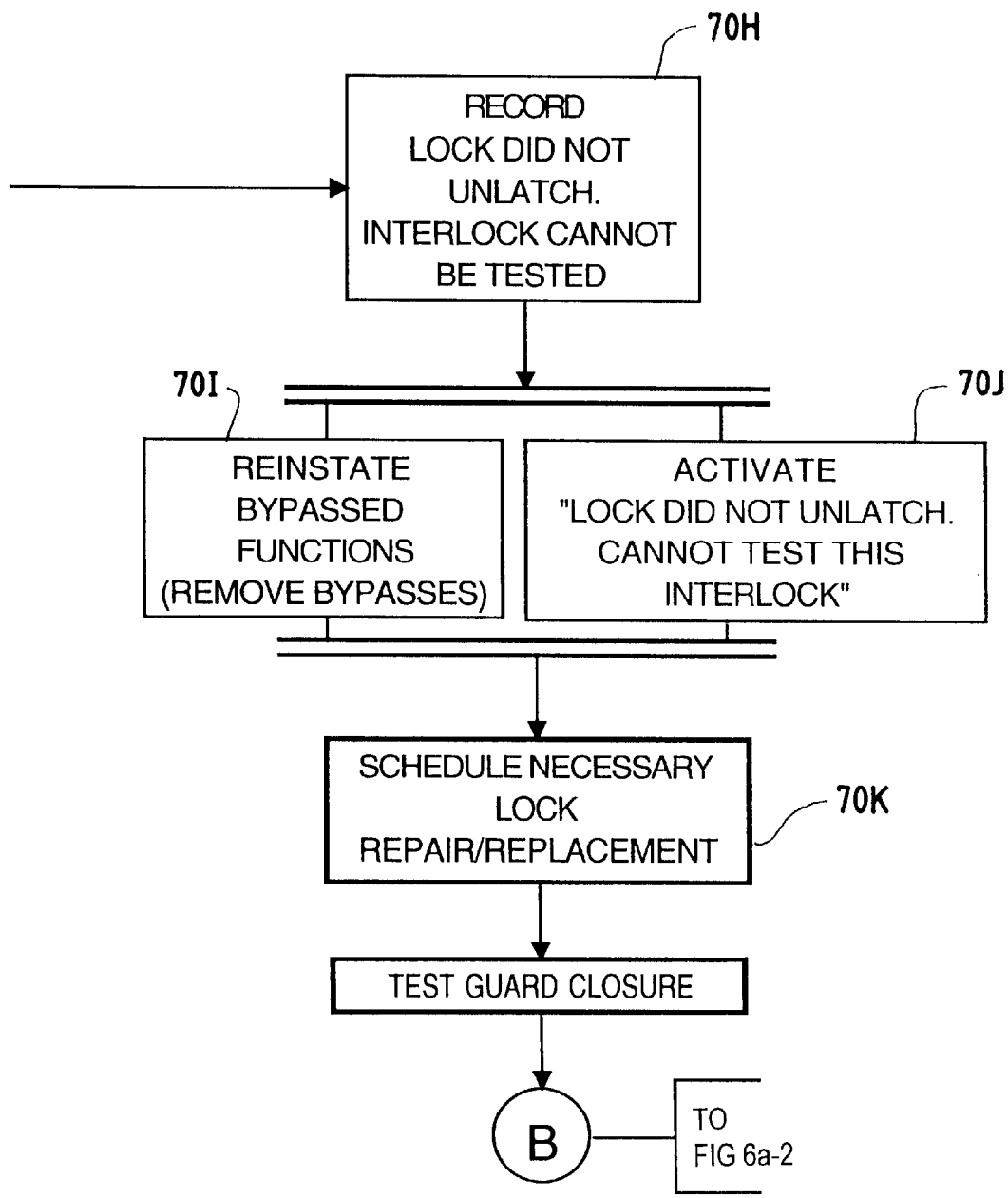
Figures 3, 6B:
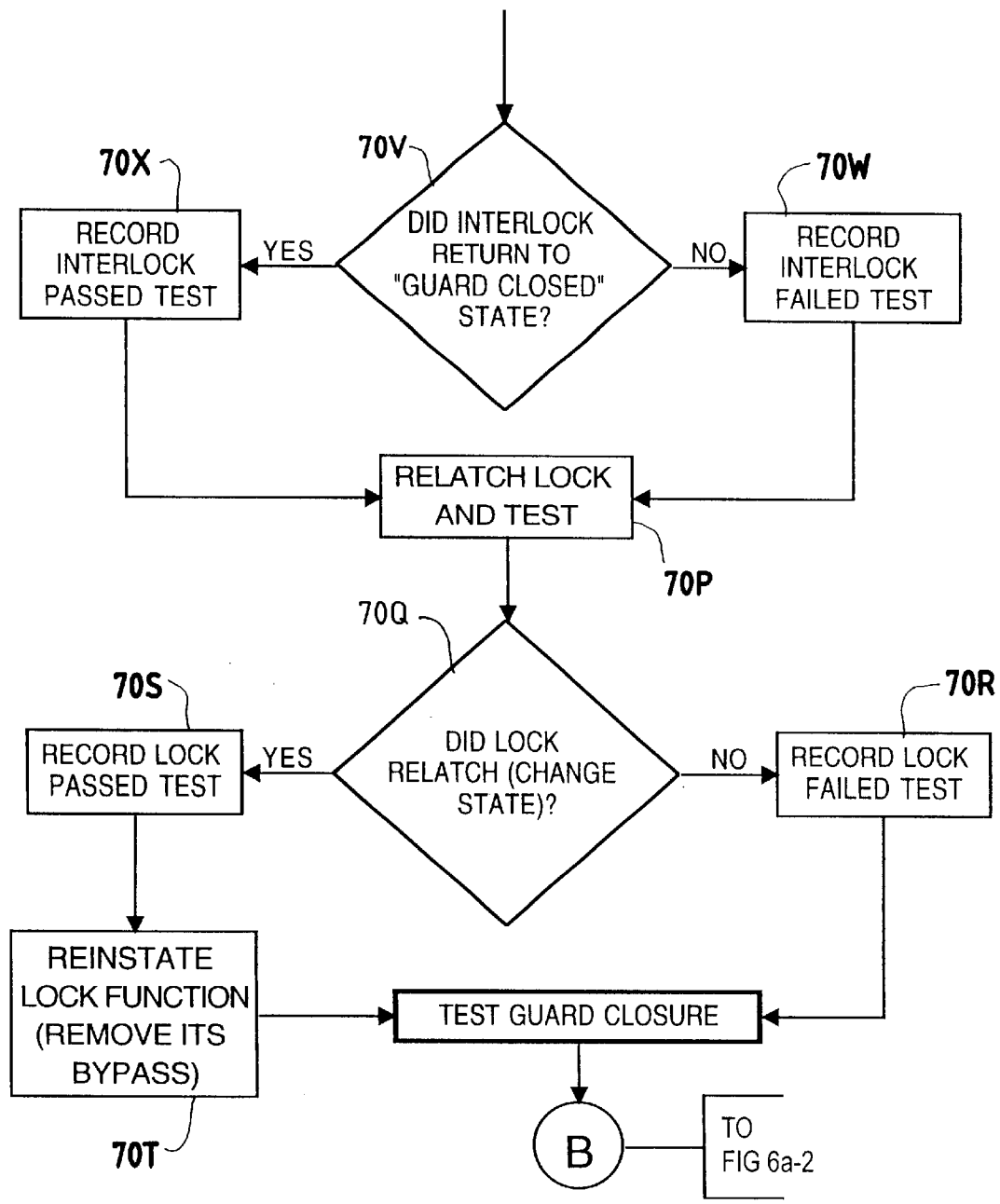
Figure 7B:
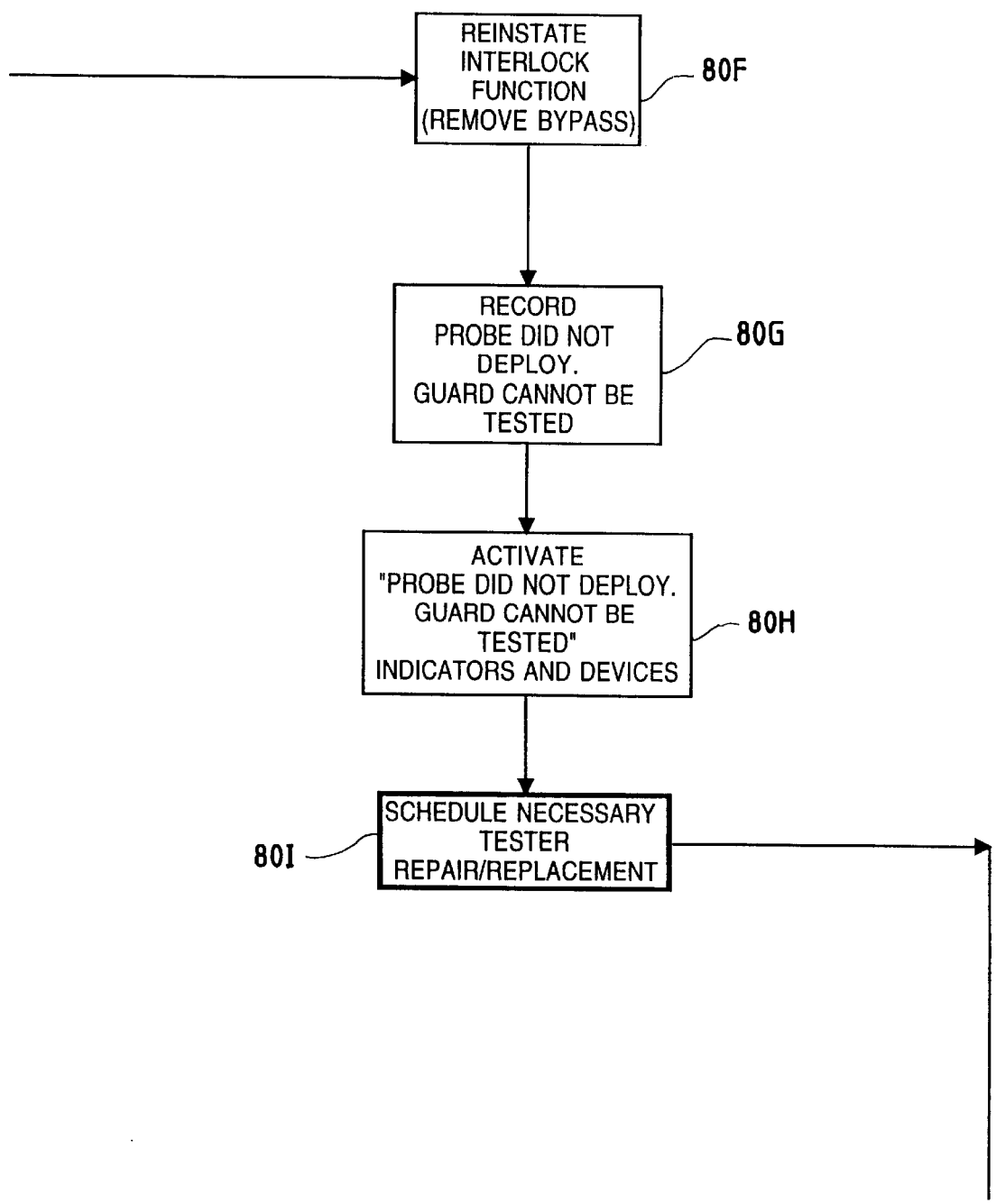
Figure 7C:
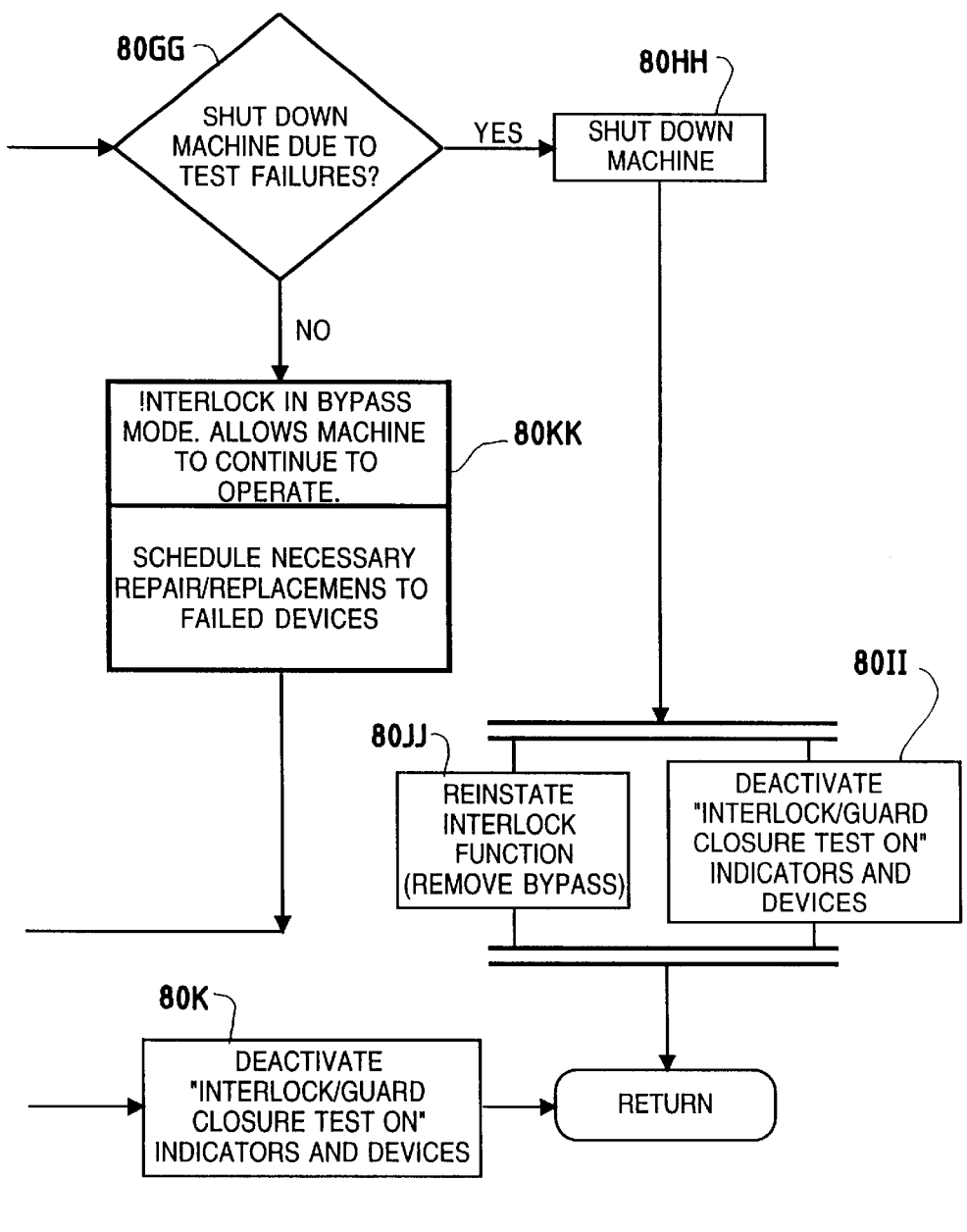
Figure 7D:
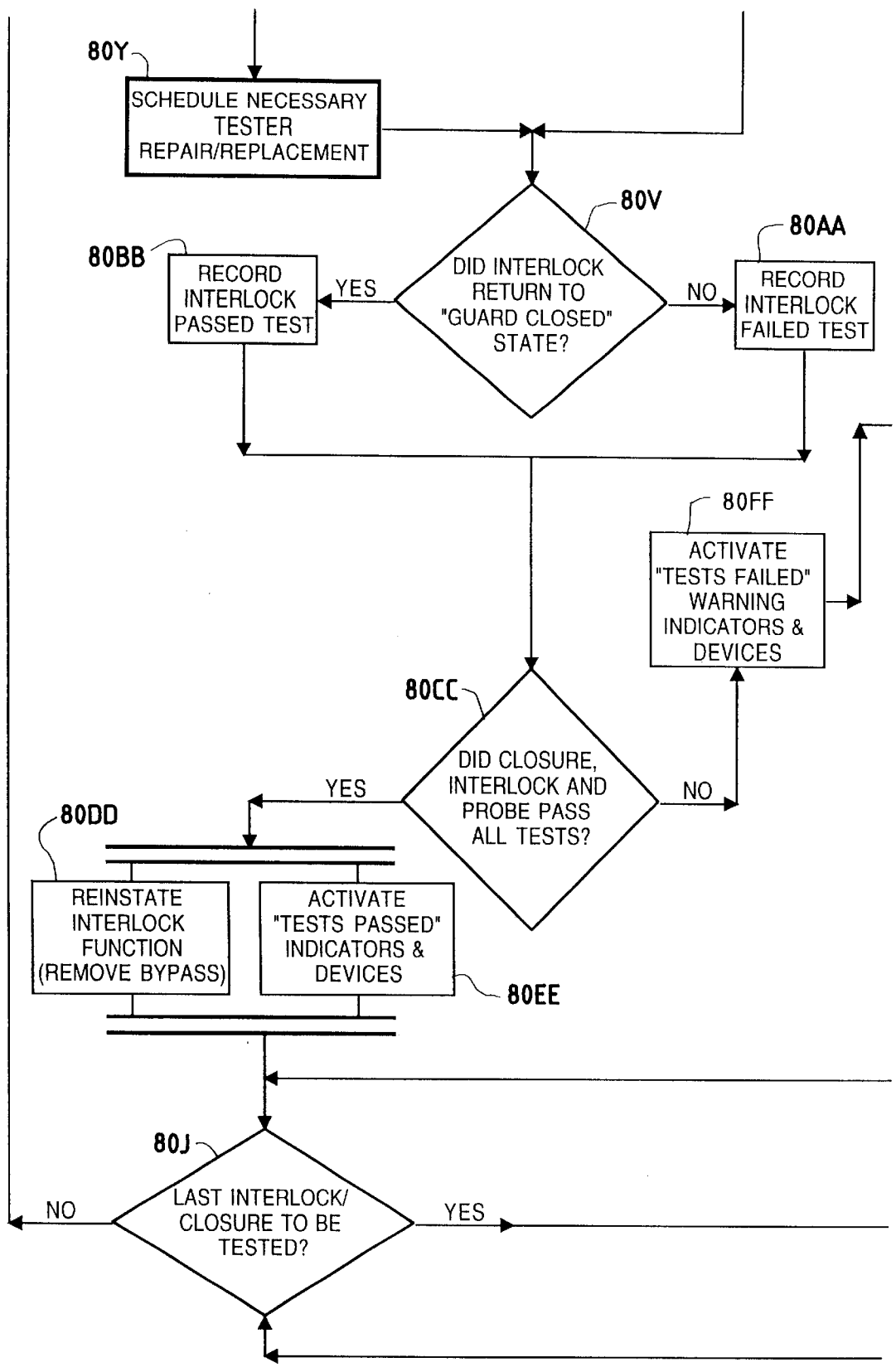
Figure 8A:
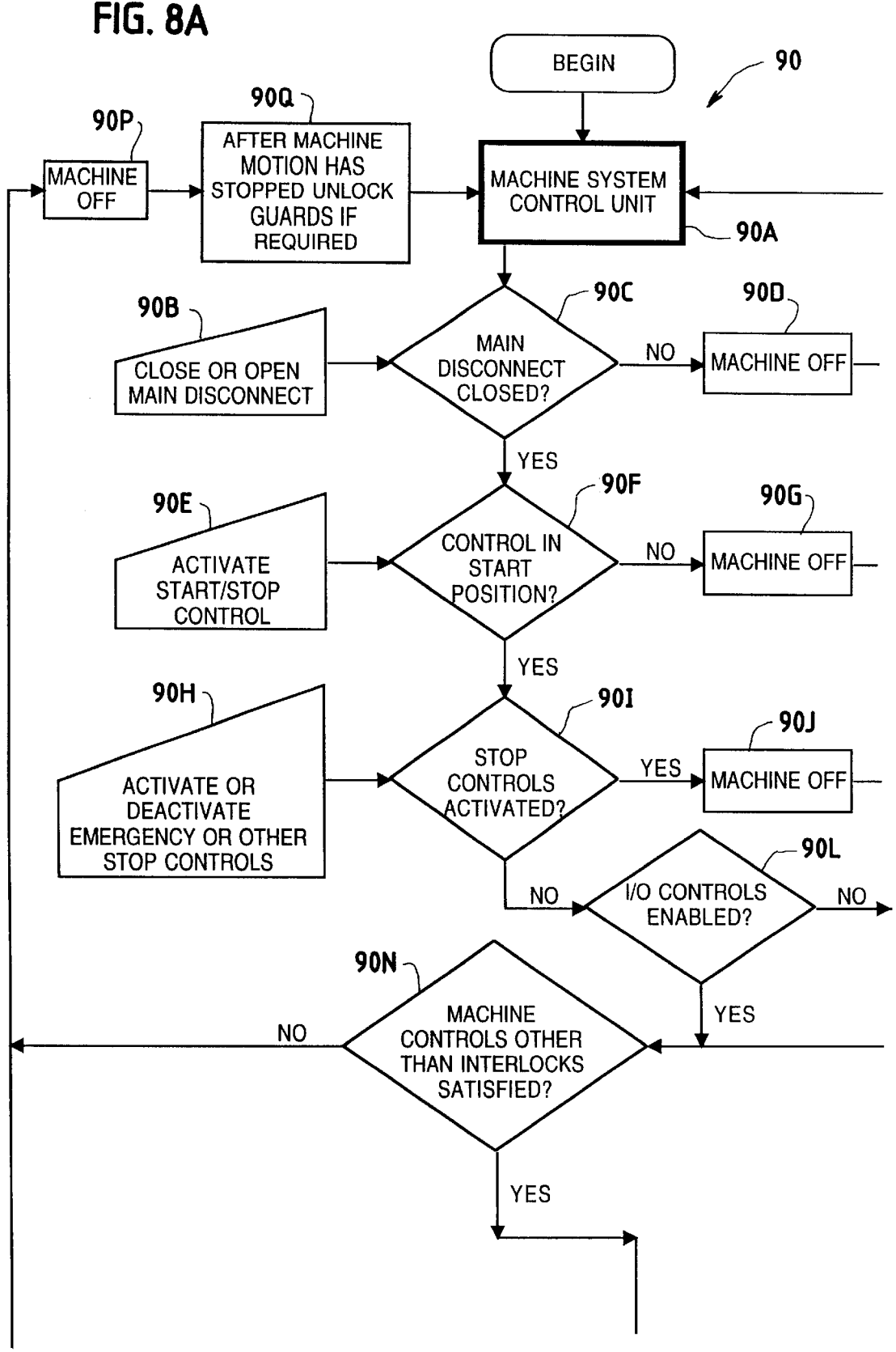
Figure 8B:
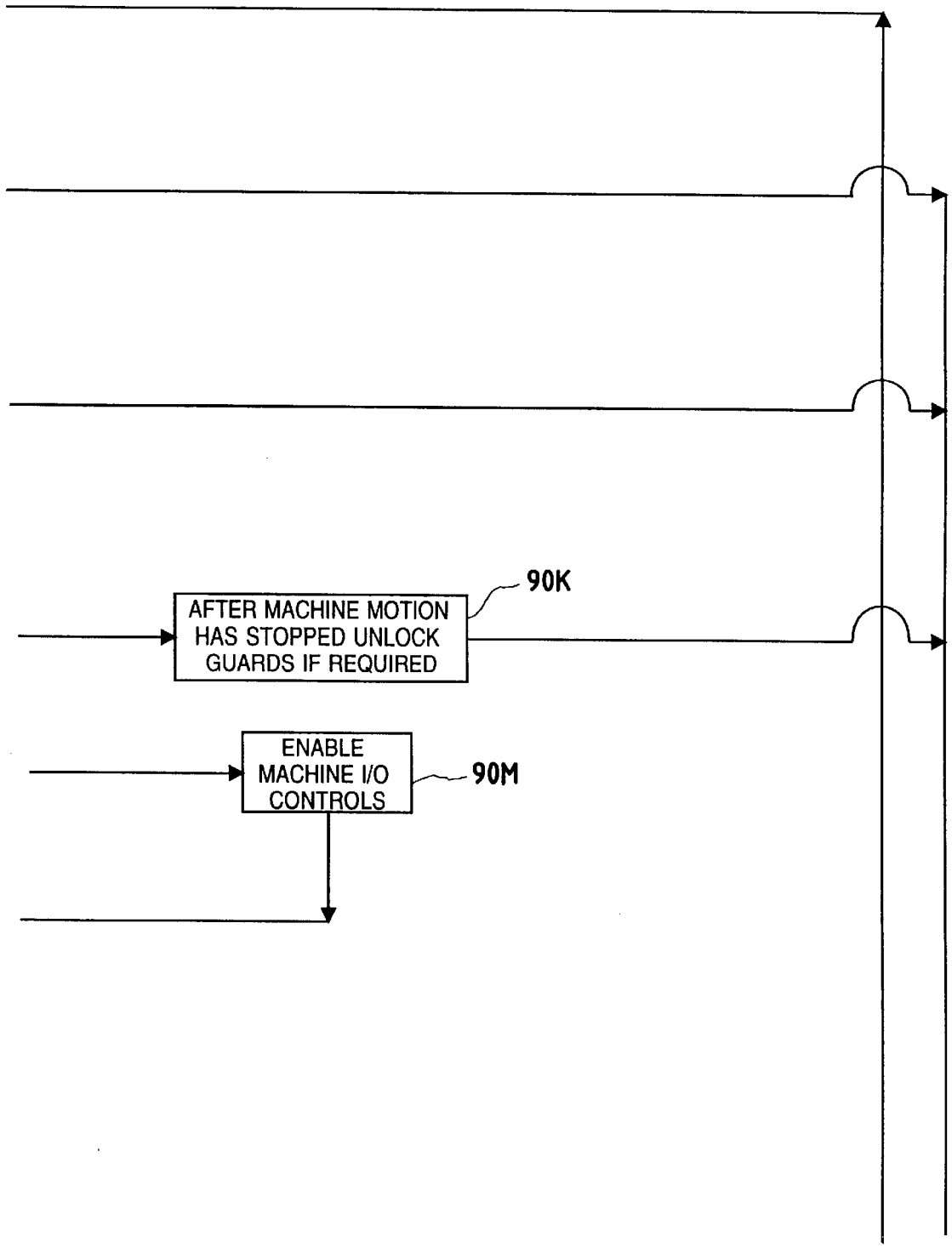
Figure 8C:
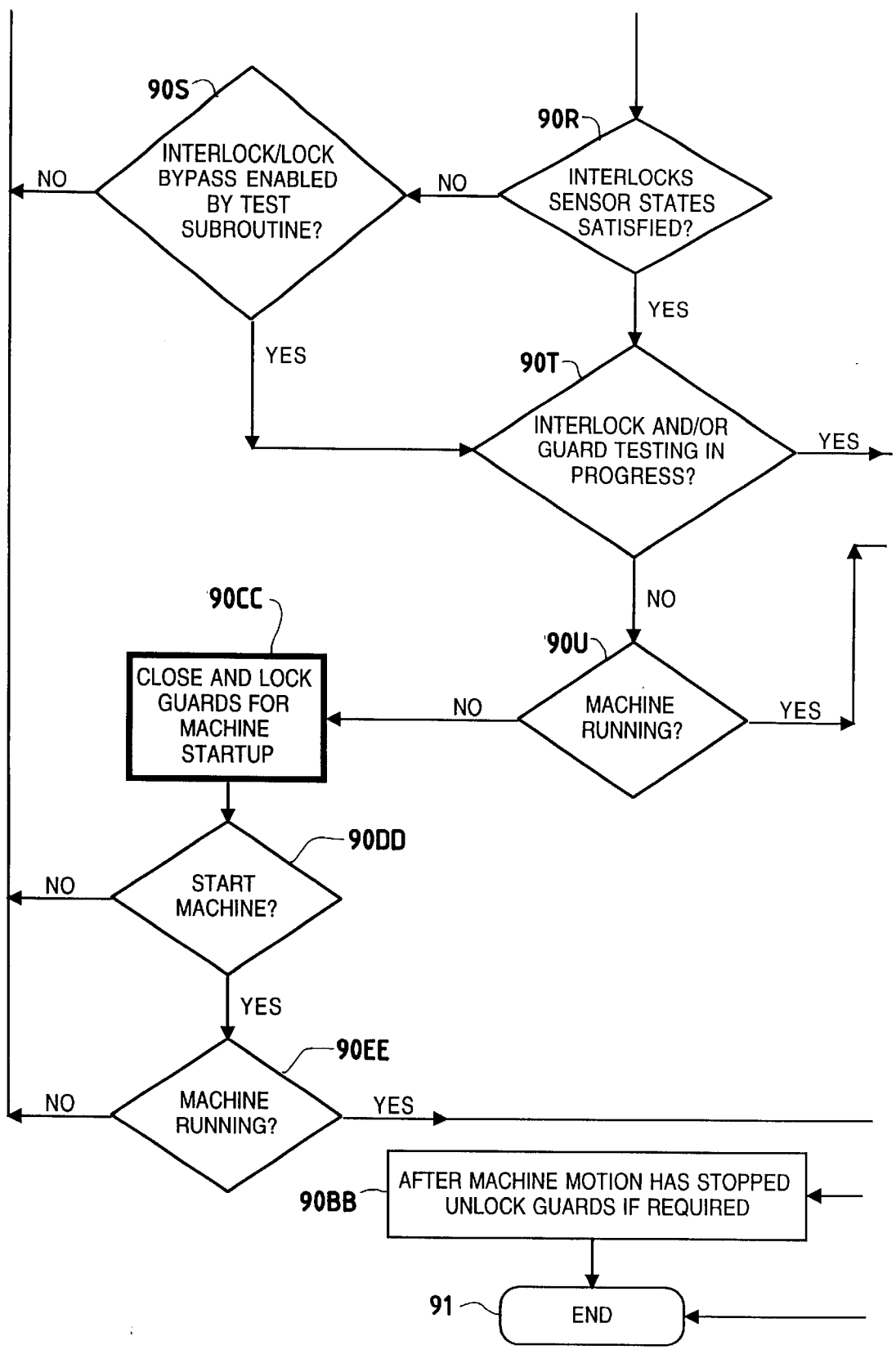
Figure 8D:
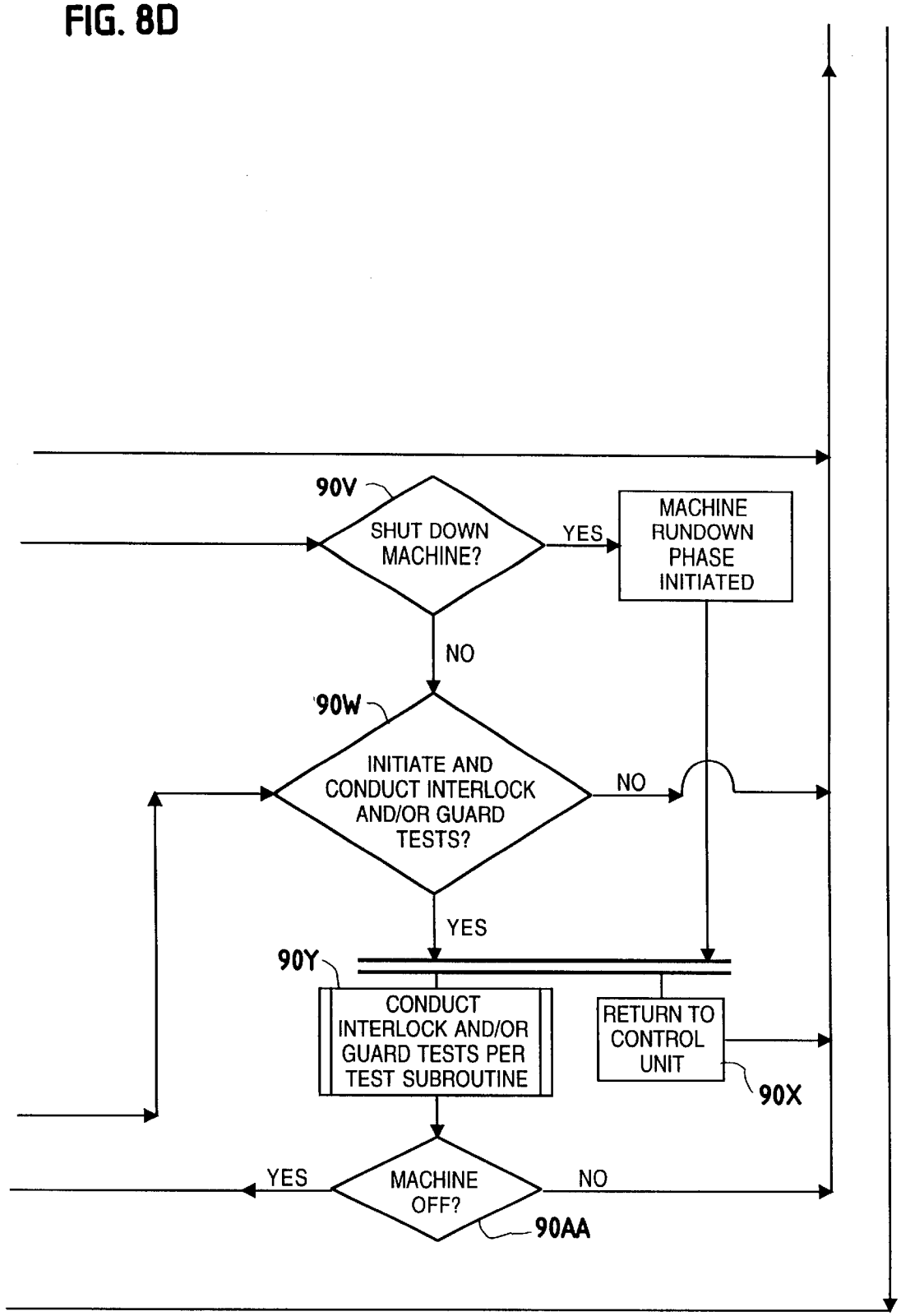

Following the recording of all passed or failed tests the system returns to test the guard closure at item B in FIG. 6a-2.

The system for testing the guard closure in FIGS. 6a-1, 6a-2, 6a-3 and 6a-4 is similar to that which has been set forth in FIG. 5a. Specifically, at 70AA the guard closure is tested by applying a tester probe to the guard closure. At 70BB whether or not the probe deployed is determined. If the probe did not deploy then at 70CC it is recorded that the probe did not deploy and the guard cannot be tested. At 70DD activated indicators will reflect that the probe did not deploy and that the guard cannot be tested. Following at 70EE the necessary test or repair and/or replacement will be scheduled and if at 70FF it is determined that the interlock testing was not performed the program will index at 71C to test the next interlock/closure. If the interlock-lock testing was performed as indicated at 7OFF and it passed as determined at 70CD, then at 7OGG (item C) is where the interlock function is reinstated and the "tests passed" indicators are activated. If the interlock-lock did not pass its test then this will be suitably indicated at 70CD and the program will proceed to 70XX, (item D).

Returning now to 70BB where if it has been indicated that the probe did deploy the next test is at 70HH where it is determined if the guard closure did open or is opened by the probe. If the closure is open or is opened, which should not have been the case, 70II will record that the guard closure failed the probe test. If the guard closure is not opened 70JJ will record that the guard passed the test. The next step is to use the interlock to make a redundant closure test check. At 70KK there will be an indication as to whether or not the interlock passed the test and if it did not 70LL will record that the interlock is not to be used to make a redundant closure check. If the interlock did pass the test the interlock is used to make the redundant closure check at 70MM and at 70NN it will be tested to see if the interlock changed to a "guard open state". If the closure test changed the interlock to the "guard open" state 70QQ will indicate that the guard closure failed the interlock test. If at 70NN the interlock did not change to the "guard open" state 70PP will indicate that the guard closure passed the interlock test. The paths from 70PP, 70LL, 70QQ and 70II all lead to 70RR where the closure tester probe is commanded to retract from the closure as indicated at 70RR. If the probe retracted or not it would show at 70SS. If the probe did retract, then at 70TT it will be determined if the closure, the interlock-lock and probe passed all tests. If the probe did not retract it is recorded that the probe did not retract at 70UU and indicators at 70VV will show that the probe did not retract and the necessary repair and/or replacement will be scheduled at 70WW. The process then proceeds to 70TT.

If the closure, interlock-lock and probe all passed their tests "test passed" indicators and devices are activated and the interlock function is reinstated at 70GG by removing the bypass. If the closure, interlock-lock and probe did not all pass their tests, "test failed" warning indicators and devices will be activated at 70XX. Subsequently a selection is made at 70YY to either shut down the machine due to test failures at 70ZZ after which the interlock function is reinstated and testing indicators are deactivated at 71A and the process returns to the main routine shown in FIGS. 8A, 8B, 8C and 8D, or the selection is made to not shut down the machine and put the interlock and/or lock in the bypass mode at 71B to allow the machine to continue operating and schedule necessary repair or replacement of the failed device. If it is to be the last closure tested as indicated at 71C the "tests on" indicators will be deactivated at 71D and the process returns to the main routine shown in FIGS. 8A, 8B, 8C and 8D. If there are more to be tested the process will be repeated starting at the beginning to test another closure integral interlock-lock device.

A novel sixth system FIGS. 7A, 7B, & 7C and 7D illustrate a guard closure test subroutine for testing a closure protected by interlocks. In this system there is simultaneous testing of both the closure and the interlock by using the same tester. The interlock and/or the tester are compliant base mounted for this purpose which makes this approach possible. As previously mentioned the operation and structure of various types of interlocks mounted on a compliant base, interlock testers, test systems and test methods for such is discussed in detail in the aforementioned U.S Pat. No. 5,870,317. In essence the interlock will be bypassed and the guard closure and the interlock will be tested by deploying the tester probe to the guard closure and if the closure is locked and cannot be opened the interlock will retract and thus can change state, thereby permitting the testing of the interlock, and if the closure opens in response to the tester the interlock member will be tested due to its freedom to move upon opening of the closure which move again permits the interlock to change state.

FIGS. 7A, 7B, 7C and 7D is a flow chart illustrating the components of this system 80. At 80A the program test states of the interlock/guard closure to be tested are reset. At 80B the interlock function is bypassed and at the same time at 80C the "interlock/guard test on" indicators and devices are activated. Following this the guard closure and interlock are tested at 80D wherein the tester probe is moved to engage the guard closure and test the closure and interlock. At 80E it will be determined if the probe deployed and if it did not the interlock function will be reinstated at 80F and the fact that the probe did not deploy and that the guard and interlock cannot be tested is recorded at 80G. Indicators at 80H inform that the probe did not deploy and that the guard and interlock cannot be tested following which the necessary tester repair and/or replacement will be scheduled at 80I. Next, the process moves to 80J and acts to test another interlock/guard closure or if this is the last closure to be tested the "test on" indicators will be deactivated at 80K and the process returns to the main routine shown in FIGS. 8A, 8B, 8C and 8D. If the probe did deploy at 80E then at 80M there is a determination if the guard closure opened upon being acted upon by the probe or is open. If the guard closure is opened or is open there will be a record made that it failed the probe test at 80N and if the guard closure did not open it will be recorded that the guard closure passed the test at 80P.

If the probe has moved the guard to the open position the interlock is free to move and thereby change to the "guard open" state, and at 80Q it is determined if it did so. If the interlock changed state it will be indicated that the interlock passed this test at 80S or if it did not change state the test failure is indicated at 80R. At 80T the tester probe is commanded to retract from the closure and at 80U there will be a determination as to whether or not the probe did retract. If the probe retracted the process moves to 80V. If the probe did not retract a record of this is made at 80W and indicators will activate at 80X indicating that the probe did not retract, upon which the necessary repair and/or replacement will be scheduled at 80Y and the process proceeds to 80V.

Returning now to 80V if the interlock did not return to the "guard closed" state a record that the interlock failed the test will be made at 80AA and if it passed the test at 80BB. Then at 80CC there will be a determination whether the closure, interlock and probe passed all their tests and if they did then at 80DD the interlock function is reinstated by removing the bypass and 80EE will indicate that all tests have been passed. If the closure, interlock and probe did not pass their tests then the test failed warning indicator will be activated at 80FF and then at 80GG a decision is made whether to shut down the machine or not due to test failures. If the machine is shut down that will be done at 80HH and following that the interlock/guard closure test indicators and devices will be deactivated at 80II and the interlock function will be reinstated at 80JJ, and the process returns to the main routine of FIGS. 8A, 8B, 8C and 8D.

If the closure is not to be shut down then as shown at 80KK the interlock continues to be in the bypass mode which allows the machine to continue to operate and the necessary repair and/or replacement of the failed devices will also be scheduled at 80KK. Following this, it is determined at 80J if a new interlock/closure will be tested or if it is the last closure to be tested, then the interlock/guard closure test indicators will be deactivated at 80K and the process returns to the main routine of FIGS. 8A, 8B, 8C and 8D.

Figure 2B:
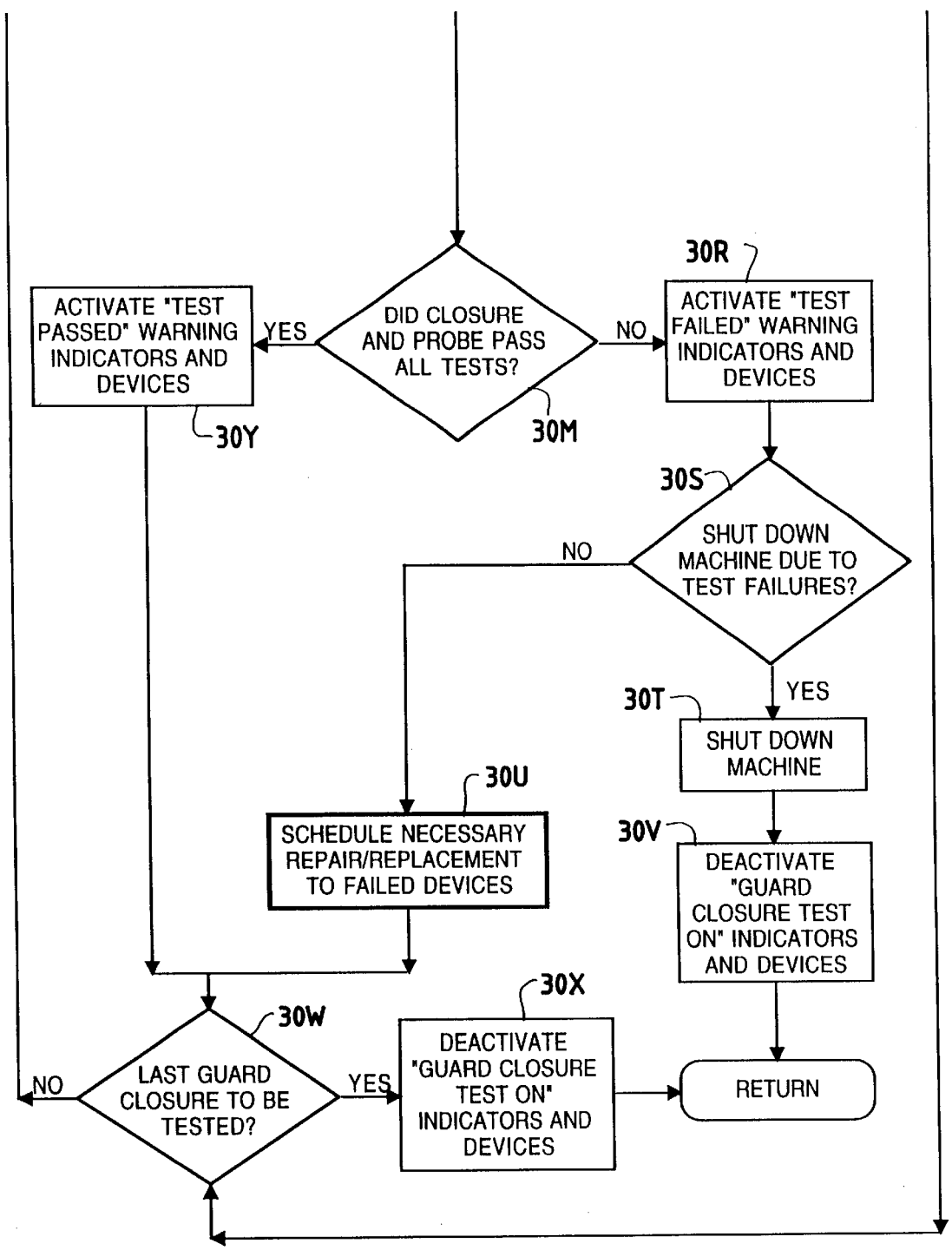
Figure 3A:
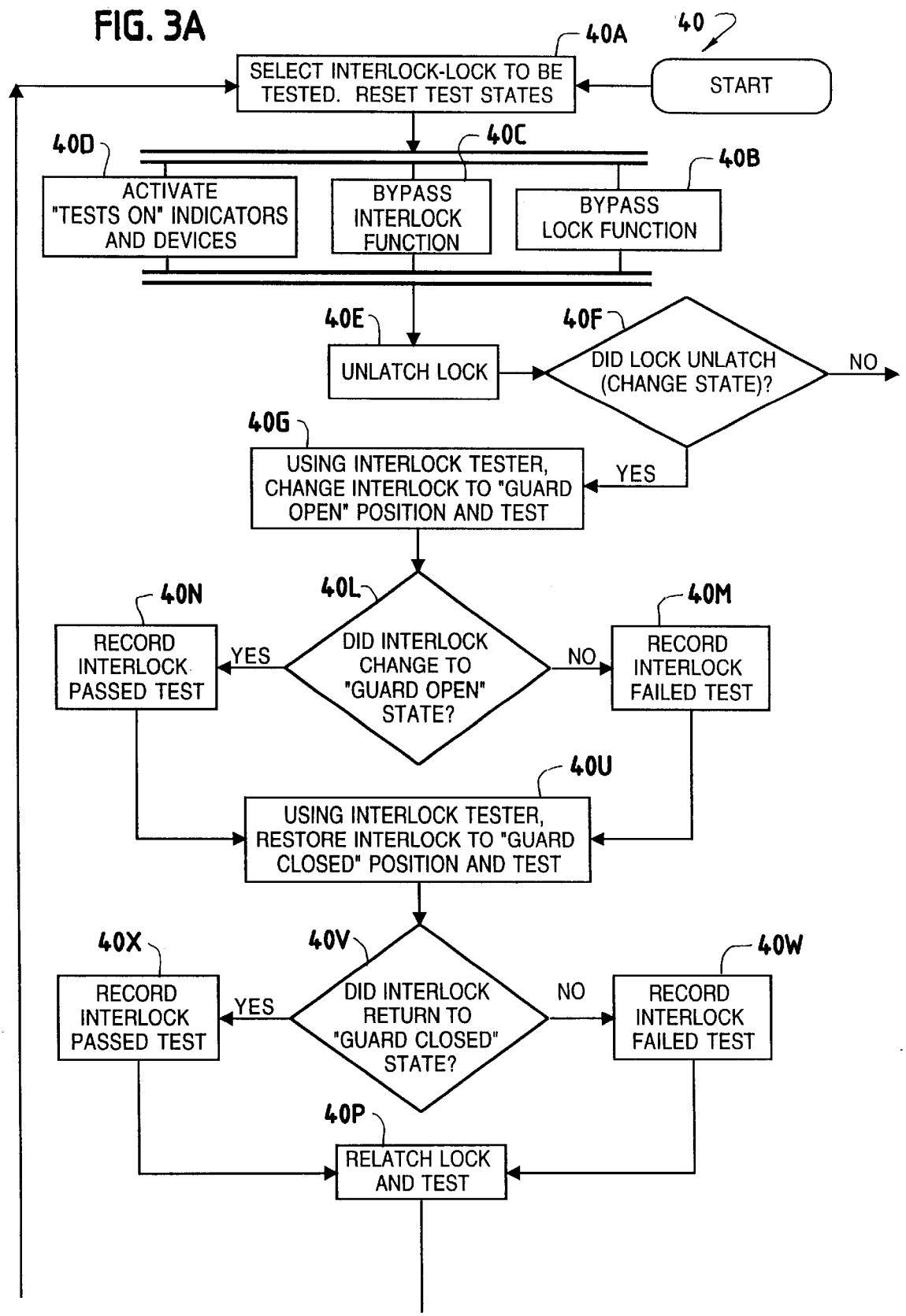
Figure 3B:
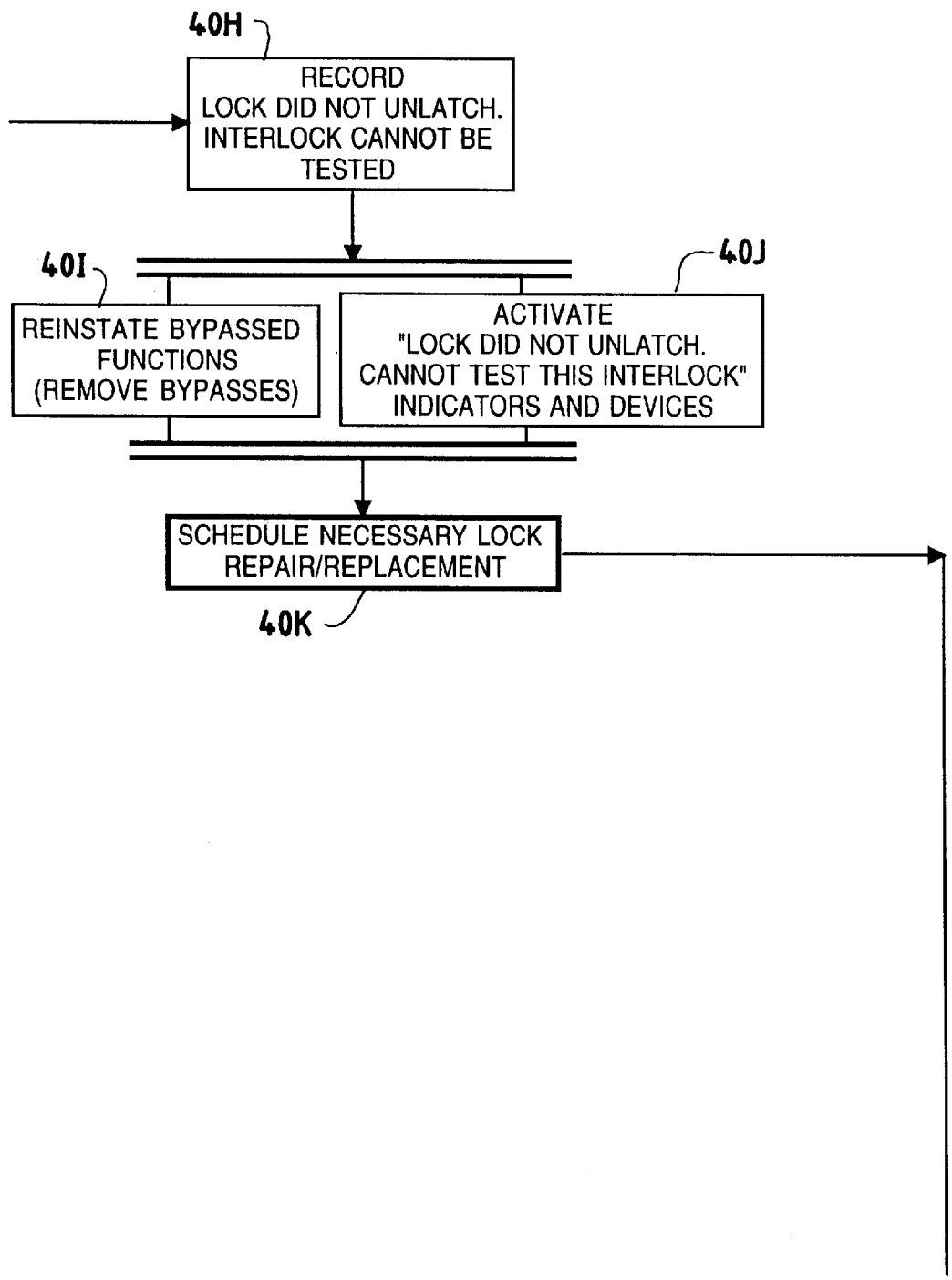
Figure 3D:
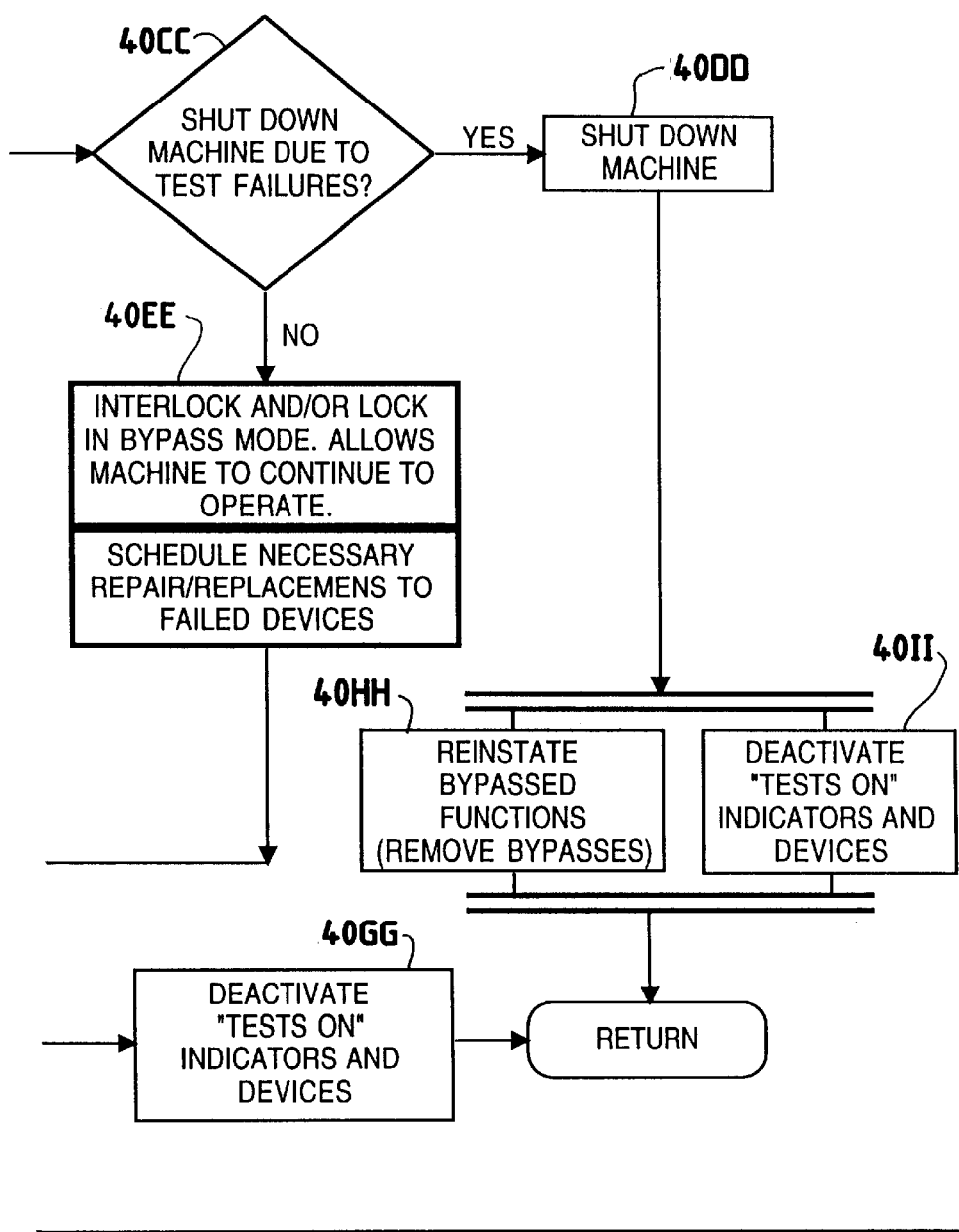
Figure 4B:
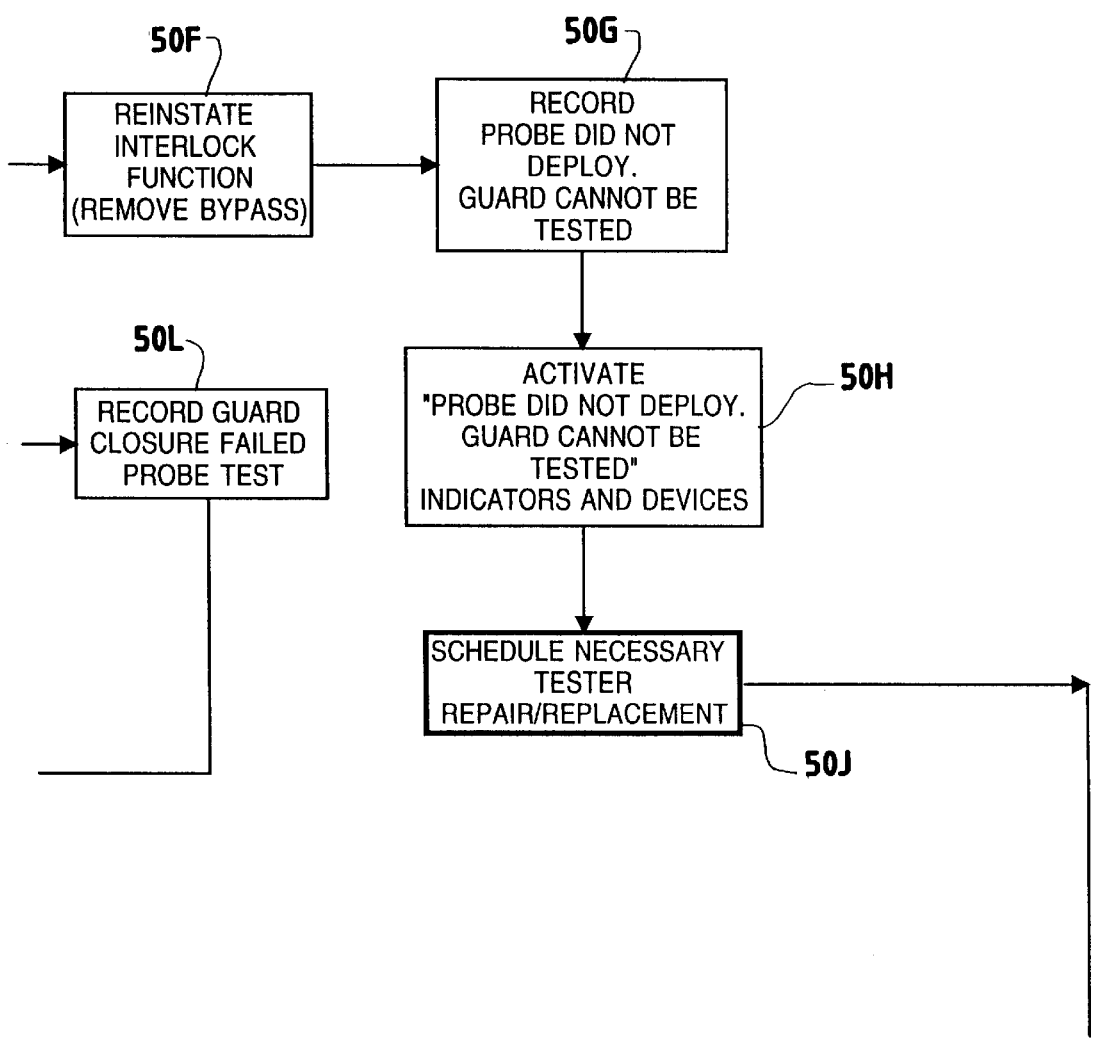
Figure 4C:
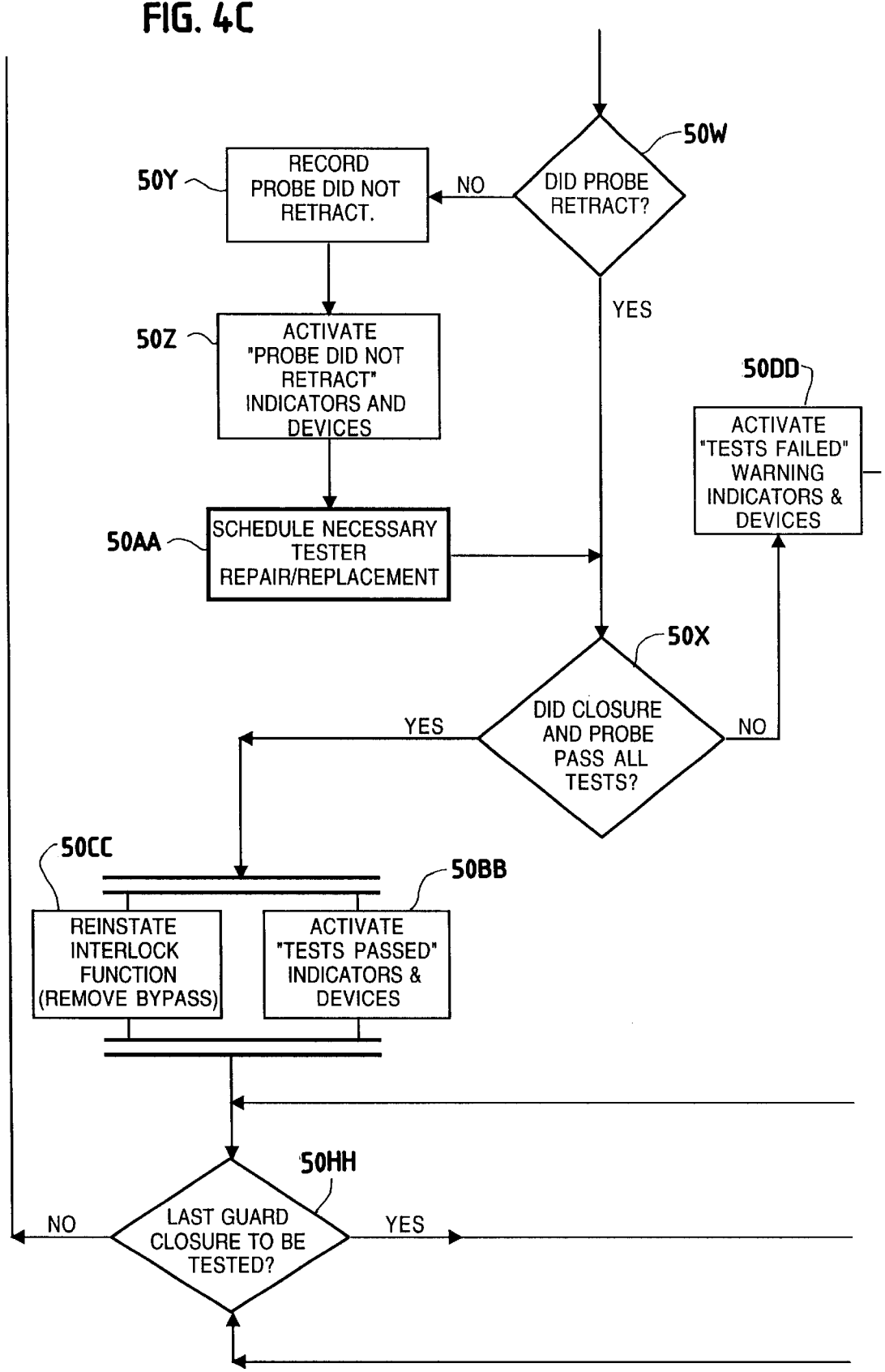
Figure 4D:
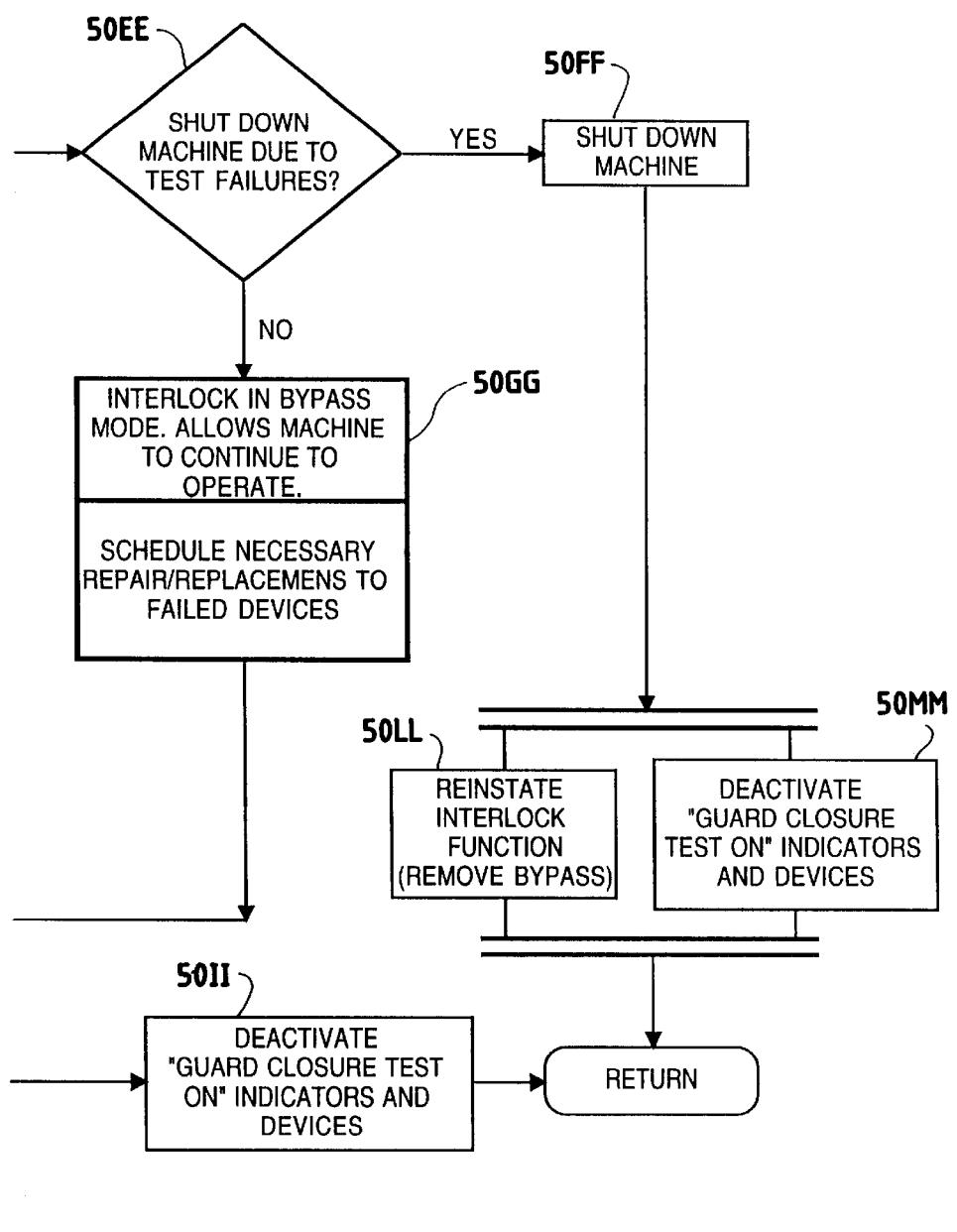

FIGS. 8A, 8B, 8C and 8D illustrate a main routine 90 which controls the running of a machine and also directs the testing of its guard closures and interlocks by means of the set of subroutines of FIGS. 2–7. The main routine 90 is similar to that described for FIGS. 2A and 2B for testing interlocks only of the referenced U.S. Pat. No. 5,870,317.

The main routine 90 directs the testing of the closures and the testing of the interlocks to be performed during running of the machine and during the rundown phase of the machine when the machine is shut down. It does so without shutting the machine down due to the testing, as described in this submission and the previously referenced U.S. Pat. No. 5,870,317. For reasons of safety, it is important to establish that during running of the machine and during its rundown phase, access is denied to the guard protected spaces containing running machine components, and that the interlocks provide the designed for protection. The guard closure and interlocks testing methods, processes, devices and systems of this instant invention and in the U.S. Pat. No. 5,870,317 are designed to determine if that is the case, or if the case is that any specific guard closure and/or interlock have failed, hence no longer provide the expected protection. These are conditions which would be unknown without testing.

The control unit 90A of the machine system may process all input and outputs, monitor all switches, and determine whether the machine is operating properly. The main disconnect may be opened or closed at block 90B and it will be determined at 90C whether the main disconnect is opened or closed. If it is not closed the machine will be turned off at 90D. If the main disconnect is closed then the start/stop controls will be queried at 90F and it will be determined at 90F if the control is in the start position. If the control is not in the start position the machine will be turned off at 90G. The emergency or other stop controls will be activated or deactivated at 90H and at 90I it will be determined if the stop controls have been activated or not. If the stop controls have been activated the machine is turned off at 90J and after the machine motion has stopped the guards will be unlocked if required at 90K. If the stop controls are not activated it will be determined if the input/output (I/O) controls are enabled at 90L. If they are not enabled it will be so indicated at 90M. If the controls are enabled there will be a determination at 90N if the machine controls other than the interlocks are satisfied. If they are not the machine will be turned off at 90P and after the machine motion has stopped the guards will be unlocked if required at 90Q before returning to the main system control unit at 90A.

If the machine controls other than the interlocks are satisfied there will be a determination at 90R as to the satisfaction of the interlock sensor states. For any interlock whose sensor states are not satisfied it will be determined at 90S if its interlock/lock bypass has been enabled by the interlock test subroutine when the interlock was tested. If the interlock bypass has not been enabled, the machine will be turned off at 90P. If the bypass is enabled at 90S, or the interlock sensor states are satisfied at 90R, then at 90T it will be determined if the interlock and/or the guard testing is in progress. If the testing is in progress there is a return to the machine control system at 90A. If the testing is not in progress the determination will be made at 90U if the machine is running. If the machine is running a determination is made at 90V whether or not to shut down the machine. If the machine is not to be shut down it will be determined at 90W if the interlock and/or guard tests are to be initiated. If they are to be initiated and conducted, they are performed at 90Y by utilizing the appropriate test subroutine from the sets illustrated by FIGS. 2–7. In parallel with the testing initiation, control is returned at 90X to the machine system's main control unit 90A, so that the machine can be checked and kept under control while the testing is in progress. If at 90V it is determined to shut down the machine, the machine run down phase will be initiated at 90Z and the interlocks and guards will be tested at 90W during this rundown phase by utilizing the appropriate test subroutine from the sets illustrated by FIGS. 2–7. In parallel with the testing initiation, control is returned at 90X to the machine system's main control unit 90A, so that the machine can be checked and kept under control while the testing is in progress. After completing the tests at 90Y a determination is made at 90AA if the test subroutine at 90V shut the machine off. If the subroutine at 90Y did not shut off the machine, then 90AA returns to the machine's main control unit 90A. If the subroutine 90Y did shut off the machine, then 90AA branches to 90BB where after the machine motion has stopped the guards will be unlocked if required.

To complete the description of the system we return to 90U and discuss what occurs if it has been determined that the machine is not running. If it is determined at 90CC that the machine is not running the guards will be closed and locked to enable machine startup. Following this at 90DD it will be decided whether to start the machine or not. If the decision at 90DD is not to start the machine then the control branches to 90P, the "machine off" status. If the decision is to start the machine, then the machine's running status is determined at 90EE. If running, the control branches to 90W. If not running then control branches again to 90P, the machine off status.

Referring now to FIGS. 9–15 there are illustrated various embodiments of structures that can be used when testing the status of guard closures alone or combined with interlocks. These are but two examples of a wide variety of mechanisms that can be employed.

The testing of the guard closures is to be performed when their status is supposed to be "the guard closure is closed and cannot be opened". This is the case during running of a machine when the closure is meant to prevent the access to a space containing the hazards of running machine components or other hazards. It is also the case when the machine is shut down and the protected machine components are running down to zero speed.

Figure 9:
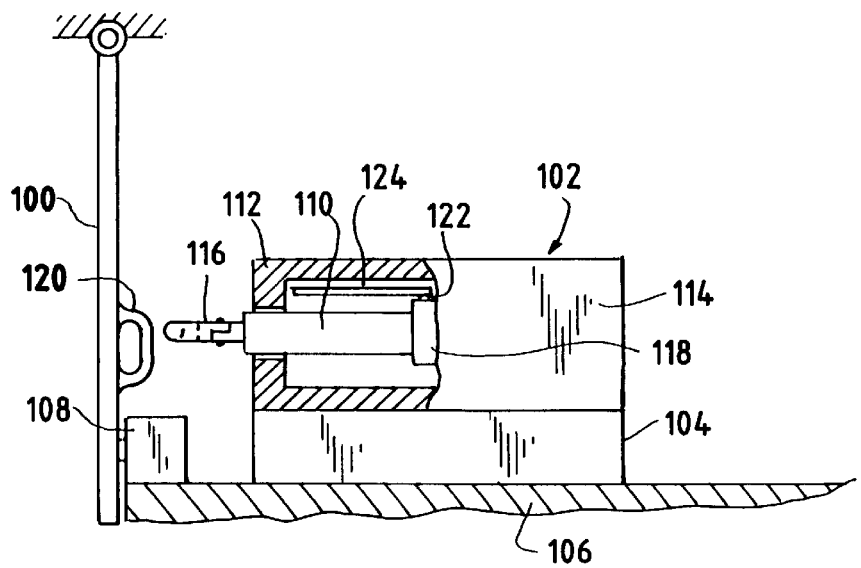
FIGS. 9–11 illustrate various positions of an embodiment including an assembly for testing a guard closure normally locked in position.
Figure 10:
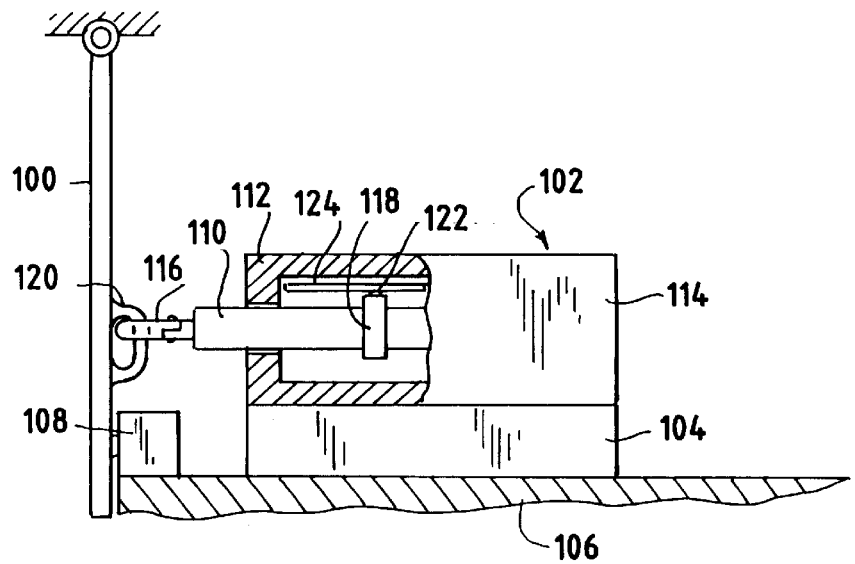
Figure 11:
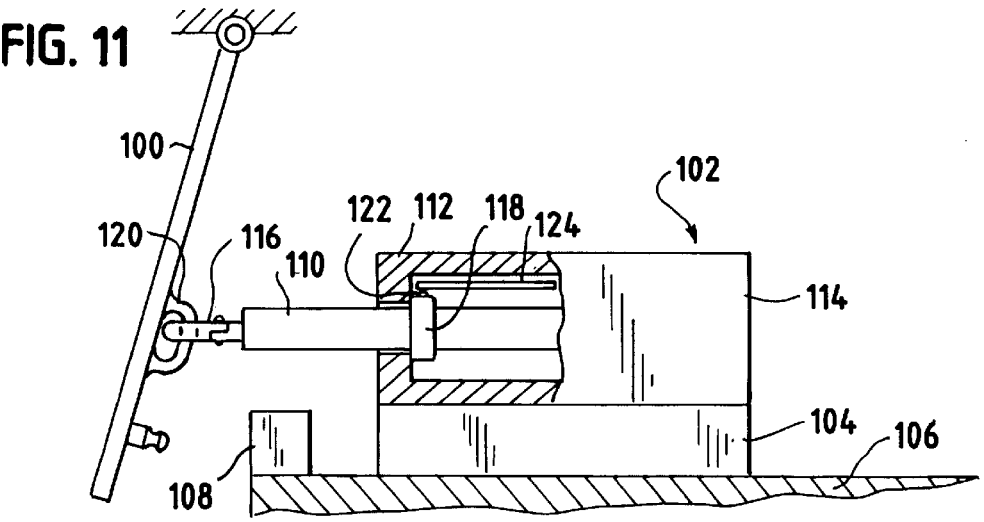

FIGS. 9, 10 and 11 illustrate the working of a force displacement type device using a probe for testing the position status of a guard closure. In this embodiment the closure tester is separate from an interlock arrangement but it can be appreciated that an interlock device separate from the tester as well as a device for testing the interlock may be present if desired. In FIGS. 9, 10 and 11 a lock is provided to keep the guard closure latched closed while the closure is in its hazard protective status. In the subject arrangement the test determines whether the guard closure opens or not due to the test or whether it is found in the open position. If the closure is operating correctly (locked) when the test is employed the guard closure should neither be open nor should it open in response to the tester probe.

Referring specifically to the three figures which illustrates different positions of the same embodiment there is shown by way of example only a hinged closure 100 that is being tested. The invention is applicable to testing slidably or otherwise movable closures as well as fixed closures while in their hazard protective status. Similarly, the instant embodiment can use a pusher probe of any suitable force including a pulsating force. Likewise, testers other than a pusher type can utilize the testing method described here.

The tester assembly 102 in FIG. 9 is shown connected to a rigid mount 104 that is connected to a machine bed 106.

Also secured to the machine bed is a closure lock 108 that is designed to maintain the closure in the locked position. As aforementioned, the purpose of the subject test is to determine if the closure cannot be opened, or it can be opened due to whatever cause, one of which can be the failure of the lock. Furthermore, this tester assembly 102 is capable of being checked during testing to determine that the tester probe is functioning correctly. If a separate interlock which is an integral interlock-lock is to be tested the lock 108 can be designed to be unlatched and relatched as required by such a test. Because of this action the unlatching and latching functions of the integral lock are also tested for. The testing device of FIGS. 9, 10 and 11 can be utilized in conjunction with the flow diagrams discussing the operation of the various routines for testing guard closures, interlocks and locks etc., disclosed in detail with respect to FIGS. 2–6 previously described.

To test whether the closure 100 is closed and cannot be opened, or can be opened or is open the tester assembly includes a probe 110 located in a housing 112. The probe 110 is moved by a tester/motor actuator 114 located at the rear of the housing 112. The probe 110 has secured to its outer end thereof a gripper member 116 that includes a set of jaws that are in the normally open position. The gripper member 116 includes a touch trigger (not shown) which when it comes into contact with the closure handle 120 closes the gripper jaws around the closure handle 120. This type of gripper, because of its touch trigger, will latch on to the closure handle regardless if the closure cannot be opened, or if it can be opened, or if it is open. The movement of the probe assembly 110 is limited by the collar 118 which will engage the housing when in its extended position as shown in FIG. 11.

Attached to the collar 118 is a probe displacement contact member 122 that during probe movement glides along the probe position sensor 124 that is mounted in the probe housing 112. The position sensor can be a continuous strip or can consist of a row of discrete position sensors and functions to indicate the position of the probe which is suitably recorded. As shown in FIG. 9 the gripper 116 is spaced from the handle 120 by a gap. When the test is initiated, the probe is commanded to move the probe gripper 116 toward the closure handle 120. If the gap between them is closed, then this gap closure will be indicated by the contact member 122 on the position sensor 124, and such movement will determine that the probe 110 has deployed. If no movement was indicated, then the probe 110 has failed to deploy for testing, which is a tester failure. When the probe 110 is moved by the tester motor 114 the position is monitored by the sliding movement of the contact member 122 relative to the position sensor 124.

Turning to FIG. 10 there is shown the position of the various components when the gripper member of the tester probe comes into gripping contact with the handle 120 of the hinged closure. In that position it is assumed that the closure remains in the closed position and cannot be opened by the tester probe. Suitable indicators will record this movement to show that the probe 110 moved only that amount to engage the closure handle 120 and thus that the guard closure passed the test in that it remained in the closed position. In the event the closure can be opened or is open the closure is moved to the open position shown in FIG. 11 by the power driven probe 110. When this occurs the sensors 124 will indicate that the probe has extended a certain distance and thus the closure did fail its test. When the test is completed the tester is retracted and tests are conducted to check if the tester returned to the position shown in FIG. 9. The retraction action forces open the gripper jaws of the tester.

The above mentioned probe retraction may result in the probe retracting only partially or not at all. In that case, it will be so indicated by the position of the contact member 122 on the position sensor 124, which will thereby signal that the probe 110 has failed to retract as commanded, which is a tester failure.

Turning now to FIGS. 12, 13, 14 and 15 there is illustrated an arrangement in which there is the testing of a closure guard by a force displacement member identical to that disclosed in FIGS. 9–11. The identical components are given the same numbers and the description of their operation is set forth in the previous paragraphs. This arrangement distinguishes from the previous design in that the closure tester assembly is connected to an interlock assembly that is resiliently mounted to the machine base. Also, this arrangement performs both the closure test and interlock test simultaneously, with the same common tester as is illustrated in FIGS. 12 through 15. The arrangement works equally well when the interlock is attached to the tester and the tester is resiliently mounted to the machine base. FIGS. 7A, 7B, 7C and 7D previously described, discloses a flow chart as to how the various components are tested and what takes place in the event the closure and/or interlock passes or fails its tests.

Figure 12:
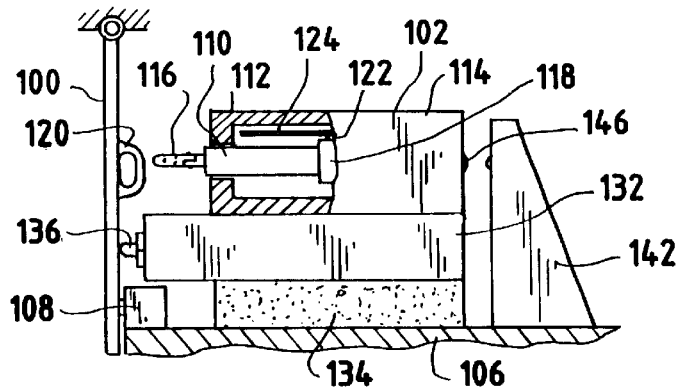
FIGS. 12–15 illustrate various positions of a second embodiment for testing a guard closure and an interlock in which the closure tester is connected to a interlock assembly that is in turn secured to a complaint base.

Referring first to FIG. 12 it is noted that tester assembly 102 is secured to an interlock 132 which is in turn secured to a resilient base 134 that is connected to the machine base 106. Lock 108 is also connected to the machine base and functions to lock the hinged closure 100 in position against the machine base. As shown, the interlock 132 has a sensor member 136 in contact with the hinged guard 100. The testing of this type of interlock arrangement is described in detail with respect to FIGS. 6–7 of the aforementioned U.S. Pat. No. 5,870,317. The interlock normally acts to turn off the machine when the guard is opened or its state is otherwise changed. Therefore, during the testing the interlock is bypassed so that testing can proceed while the machine is running, without the test shutting down the machine. The previously described flow chart in FIGS. 7A, 7B, 7C and 7D sets forth in detail the testing procedure of the closure and interlock.

Also in FIG. 12 there is shown a tester displacement rigid blocker 142 which is connected to the machine base 106. This blocker has a sensor contact 144 attached to it and a matching sensor contact 146 is located on the near end of the test assembly 102.

The combined closure and interlock testing of the embodiment shown in FIGS. 12, 13, 14 and 15 starts by the tester/motor actuator 114, being commanded to move the probe 110 toward the closure 100. As previously described with respect to FIG. 9, if by this probe movement the gap present between the gripper 116 and the closure handle 120 shown in FIG. 12 is closed, then the contact member 122 will indicate this on the position sensor 124, and such movement will determine that the probe 110 has deployed. If no movement is indicated, then the probe did not deploy for testing, which is tester failure.

Figure 13:
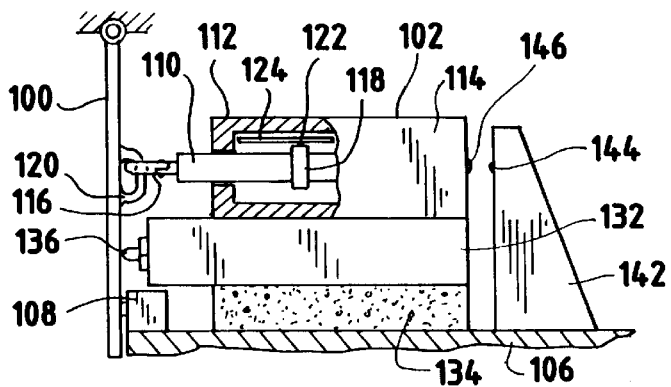

If the probe does deploy, then the gripper jaws 116 will engage the closure handle 120 and latch on to it, as shown in FIG. 13. At this stage the tester/motor actuator 114 continues pushing the probe 110 toward the closure 100. If the closure is closed and cannot be opened then the situation shown in FIG. 14 will take place.

Figure 14:
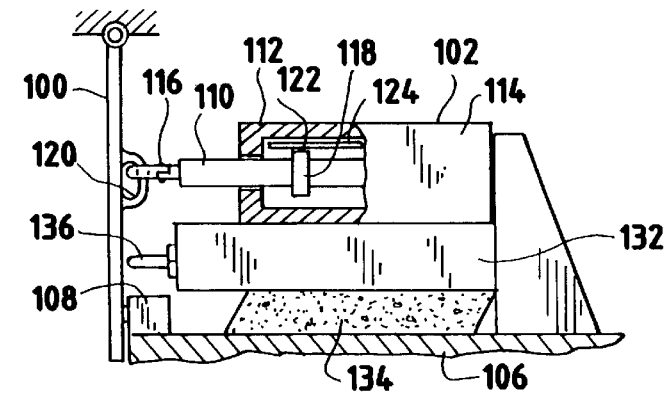

As shown in FIG. 14 the tester 102 and interlock 132 will move in the direction away from the closure 100, ending up butting against the rigid blocker 142. This is made possible because the resilient base 134 will distort as shown in FIG. 14, to accommodate this movement. The contact sensors 144 and 146 will indicate that this butting of the tester 102 against the blocker 142 has taken place. This indication together with the position of the contact member 122 on the position sensor 124 will indicate that the closure 100 is not open and cannot be opened, and the closure has passed the test.

As is further shown in FIG. 14, the butting position of the tester 102 against the rigid blocker 142 removes the interlock from contact with the closure 100, and thus frees the interlock sensor member 136 to be able to change to its "guard open" position. This tests the interlock as described in detail with respect to FIGS. 6 and 7 of the aforementioned U.S. Pat. No. 5,870,317.

At the completion of the combined closure and interlock test of FIG. 14, the tester/motor actuator 114 is commanded to retract the probe 110 to the position shown in FIG. 12. The retraction action forces open the gripper jaws of the probe, freeing the closure from the probe.

As is shown in FIG. 12, the retracted position returns the interlock sensor member 136 to its "guard closed" position. Checking if this return results in the change of the interlock to its "guard closed" state constitutes the second part of the interlock testing routine as described in detail with respect to FIGS. 6 and 7 of the aforementioned U.S. Pat. No. 5,870,317.

The previously mentioned command to retract the probe 110 from the position shown in FIG. 14, to that shown in FIG. 12, may result in the probe retracting only partially or not at all. In that case, it will be so indicated by the position of the contact member 122 on the position sensor 124, which will thereby signal that the probe 110 has failed to retract as commanded, which is a tester failure.

Figure 15:
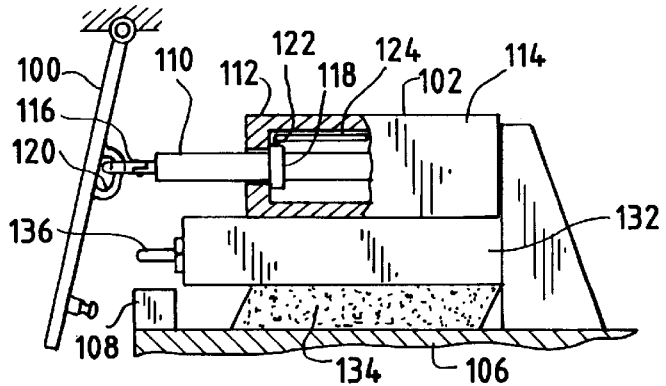

If the tester shows that the closure 100 can be opened or is open, then this constitutes a closure failure. The situation shown in FIG. 15 typifies this, if the opening resistance of the closure 100 to the force applied to it by the probe 110 is sufficiently large. As shown, the tester 102 and the interlock 132 will move in the direction away from the closure 100, ending up butting against the rigid blocker 142. This is made possible because the resilient base 134 will distort as shown in FIG. 15, to accommodate this movement. The contact sensors 144 and 146 will indicate that this butting of the tester 102 against the blockers 142 has taken place. This indication, together with the extended position of the contact member 122 on the position sensor 124 will indicate that the closure 100 can be opened or is open hence has failed the test.

The situation can ensue, such that the closure 100 opens so easily or so far that the resilient mount 134 does not distort or does not distort sufficiently to cause a butting contact between the tester 102 and the rigid blocking member 142. In this situation the probe ends up in its fully extended position. The position of the contact member 122 on the position sensor 124 will indicate that this is the case, and thereby indicate that the closure can be opened or is open, and thus the closure has failed the test.

In either closure open or opening case described above, the interlock sensor member 136 is removed from contact with the closure 100, and thus frees the interlock sensor member 136 to be able to change to its "guard open" position. This tests the interlock as described in detail with respect to FIGS. 6 and 7 of the aforementioned U.S. Pat. No. 5,870,317.

At the completion of the closure test for which the indication is that the closure 100 can be opened or is open, the tester/motor actuator 114 is commanded to retract the probe 110 to the position shown is FIG. 12. The retraction action forces open the gripper jaws of the probe, freeing the closure from the probe.

The retracted position returns the interlock sensor member 136 to its "guard closed" position. Checking if this return resulted in the change of the interlock to its "guard closed" state constitutes the second part of the interlock testing routine as described in detail with respect to FIGS. 6 and 7 of the aforementioned U.S. Pat. No. 5,870,317.

The previously mentioned command to retract the probe 110 to the position shown in FIG. 12, may result in the probe retracting only partially or not at all. In that case it will be so indicated by the position of the contact member 122 or the position sensor 124, which will thereby signal that the probe 110 has failed to retract as commanded, which is a tester failure.

It is intended to cover by the following claims all embodiments which fall within the true spirit and scope of the invention.

What is claimed is:

1. A method of testing a guard closure of a machine safeguarding system to determine if the guard closure functions correctly or not, including the steps of applying a force displacement type test means to the guard closure to attempt to open the guard closure, sensing the change of state of the test means to determine if the guard closure is in a proper position and if the guard closure can be opened or not, or if the guard closure is open, and applying to the guard closure a continuous or a pulsating force by a force displacement mechanism as needed to accomplish the testing.

2. The method set forth in claim 1 including the step of sensing the movement of the force displacement mechanism during the guard closure testing to determine if the force displacement mechanism is properly functioning to apply a force to the guard closure to test if the guard closure is closed and cannot be opened, opens or is open.

3. The method set forth in claim 2 including the step of retracting the force displacement mechanism and sensing if the guard closure returns to the proper position.

4. The method set forth in claims 1, 2 or 3 including the steps of recording and indicating that the test means did or did not properly function, and if the test means did not properly function, that the guard closure cannot be tested and to schedule necessary repair or replacement, and if the test means properly functions to record and indicate whether the guard closure passed or failed the testing.

5. The method as set forth in claim 4 including the steps of recording and indicating that the guard closure and test means did or did not pass all the testing, and if the guard closure and test means did not pass all the tests, activating suitable warning indicators and devices and either shutting down the machine due to test failures or scheduling necessary repair and/or replacement of failed guard closure or test means.

6. The method as set forth in claim 5 including the step of providing an interlock system and bypassing the interlock system prior to testing the guard closure and then using the interlock system to make a redundant test check of the position of the guard closure if the test means properly functioned.

7. The method as set forth in claim 5 including the step of providing an interlock system and bypassing the interlock system prior to testing the guard closure and then sequentially testing the interlock system prior to testing the guard closure and then after testing the guard closure to see if the test means therefor properly functioned and if it did, then use the interlock system to make a redundant test check of the position of the guard closure.

8. The method as set forth in claim 1 including visual or audible feedback systems or other indicators to inform users of the machine that a closure is being tested, was or was not found to be defective, and of the status of the guard closure after the testing.

9. A method of testing a machine safeguarding system including a guard closure and an interlock system having a power control circuit and sensing systems which when functioning correctly prevents the powered operation of the machine or that portion of the machine protected by the guard closure when the guard closure is opened or open, comprising the steps of bypassing from the power control circuit, the interlock system to test the interlock system, applying a test means to the guard closure to attempt to open the guard closure and sensing the change of state of the test means to determine if the guard closure is in its proper position, and changing the state of the interlock sensing system to test the functioning of the interlock circuit system.

10. The method as set forth in claim 9 in which the guard closure is latched and the guard closure is locked by the interlock system and includes the steps of unlatching the guard closure if necessary for testing the interlock system, testing the interlock system, and re-latching the guard closure to test if the guard closure is re-locked by the interlock system, wherein the testing means includes sensors to test both the guard closure and the interlock system to determine if they function correctly or not.

11. The method as set forth in claims 9 or 10 in which the test means is a single means that functions to test both the guard closure and the interlock system.

12. The method as set forth in claim 11 in which the single means includes a resilient mount.

13. The method as set forth in claim 9 which includes the step of sequentially testing the interlock system and then the test means of the guard closure and if the test means properly functioned use the interlock system to make a redundant test check of the position of the test means.

14. The method as set forth in claim 9 including the step of testing the guard closure and the interlock system with the same test means.

15. The method as set forth in claim 14 in which the test means includes a force displacement member.

16. The method as set forth in claim 15 wherein there is an initial attempt to deploy the force displacement member, and if the force displacement member did not deploy reinstate the interlock system function and record and indicate that the guard closure and interlock system cannot be tested.

17. The method as set forth in claim 16 and if the force displacement member did deploy, test to see if the guard closure opened or is open, and if the guard closure did not open, test the interlock system by moving it relative to the guard closure to permit the interlock system to be activated.

18. The method as set forth in claims 9, 10, 13, 14, 16 or 17 in which changing the state of the interlock sensing system includes the step of moving the interlock system to a guard open position and testing and recording the results of the test.

19. The method set forth in claim 18 including the steps of recording and indicating all results of the tests of the interlock system and guard closure as to whether they are functioning, whether faulty or not, and including that a guard closure did or did not unlatch and the interlock system can or cannot be tested, reinstating the bypassed functions of the interlock system and scheduling the necessary repair or replacement.

20. The method set forth in claims 9, 10, 13, 14, 15, 16 or 17 in which changing the state of the interlock sensing system includes the step of moving the interlock system to a guard open position and testing and recording the results of the test.

21. The method set forth in claim 19 including the steps of relatching the guard closure and testing and recording if the guard closure relatched and returning the interlock system to a guard closed position and recording and testing if the interlock system returned to a guard closed state.

22. The method set forth in claims 9, 10, 13, 14, 16 or 17 including the steps of reinstating the interlock system if the interlock system and guard closure passed all of its tests and activating suitable warning indicators and devices if the interlock system and guard closure did not pass all tests and if so either shut down the machine or bypass the interlock system and allow the machine to continue to operate and schedule repair or replacement of any failed components.

23. The method set forth in claim 22 including visual and/or audible feedback system and/or other indicators which inform users of the machine when and on which safeguarding system the guard closure test is being performed and if any interlock system functions have been bypassed.

24. The method set forth in claims 9, 10, 13, 14, 16 or 17 for testing a plurality of guard closures by a controller, and programming the operation of the controller to perform and time the tests in whatever order or sequence desired or in batch form, or all guard closures simultaneously, and to perform the test during running of the machine.

25. The method as set forth in claim 24 in which the interlock system includes interlocks and the controller is programmed to test the interlocks in conjunction with the guard closure in the order or sequence desired.

26. The method as set forth in claim 25 in which the controller is programmed to either interrupt the machine operation, or to continue the operation and interrupt the machine operation at another time to perform the required repair, maintenance or replacement of the faulty components upon the tests detecting a guard closure or interlock failure.

27. A method of testing a machine having a machine power control circuit and a safeguarding system including a guard closure held locked by a guard locking device and an interlock mechanism having a sensing and circuit system which when functioning correctly prevents the powered operation of the machine or that portion of the machine protected by the guard closure, when the guard closure is opened or open, comprising the steps of bypassing the interlock mechanism and guard locking device from the machine power control circuit, changing the state of the interlock mechanism and sensing such change of state to test the functioning of the interlock mechanism and the circuit and sensing system.

28. The method as set forth in claim 27 which includes a system for removing the bypass of the interlock mechanism without disrupting the machine operation from any interlock and any additional system which has not been found defective by the testing.

29. The method as set forth in claims 27 or 28 in which the interlock mechanism and guard locking device are a combined mechanism performing both the interlock and guard locking functions.

30. The method is set forth in claims 27 or 28 in which the testing of the circuit and sensing system is accomplished by a device that changes the position of the interlock mechanism relative to the circuit and sensing system.

31. The method as set forth in claims 27 or 28 in which the testing of the interlock mechanism and the sensing and circuit system and guard locking device is done by a testing system.

32. The method as set forth in claims 27 or 28 wherein the guard locking device and/or circuit and sensing system is monitored to detect a failure.

33. The method as set forth in claim 32 wherein the failure of the interlock mechanism and/or the failure of the guard locking device are detected as undifferentiated failures.

34. The method as set forth in claim 31 wherein the testing system is equipped with sensors, which monitor the operation of the guard locking device and/or the failure of the guard locking device to properly deploy.

35. The method as set forth in claim 34 wherein the failure of the guard locking device is differentiated from the failure of the interlock mechanism.

36. The method as set forth in claim 31 in which the testing system provides a means to unlock the guard locking device while the interlock mechanism is being tested in order to facilitate the testing of the interlock mechanism and includes means to relock the guard locking device at the completion of the testing of the interlock mechanism.

37. The method as set forth in claim 27 in which if the safeguarding system detects a failure in the guard locking device the interlock mechanism will be reinstated and the repair or replacement of the guard locking device will be scheduled.

38. The method as set forth in claim 27 in which the system for bypassing the interlock mechanism can maintain the interlock mechanism of a failed interlock bypassed, in order not to disrupt the machine operation due to the presence of a defective interlock mechanism detected by the testing of the interlock mechanism.

39. The method as set forth in claim 27 in which the system for bypassing the guard locking device can maintain the guard closure in a locked position in order not to disrupt the machine operation due to the presence of a defective guard locking device detected by the testing of the guard locking device.

40. The method as set forth in claim 27 including visual or audible feedback systems and or other indicators to inform users of the machine that an interlock mechanism and/or guard locking device is being bypassed for testing, tested, was or was not found to be defective, and of the status of the bypass and/or lock after the testing.

41. The method as set forth in claim 40 that incorporates a system that will inform users of the machine of the location and status of every guard locking device, closure and interlock mechanism.

42. A device for testing a guard closure of a machine safeguarding system, comprising a tester assembly including a motor or other power means actuated to a tester that is adapted to engage the guard closure to test if the guard closure is open or will open or is closed; and means for sensing the movement of the tester to determine if the guard closure opened only a safe limited amount as specified by a guard closure design and function or if the guard closure can be opened more than such limited amount or is open wherein the guard closure includes a suitable gripping member such as a handle and the tester includes a releasable engaging member for gripping said handle for insuring positive movement of the guard closure by said member during testing of the guard closure while permitting disengagement from the gripping member when the guard closure is retracted by the tester.

43. The device as set forth in claim 42 including an interlock testing and indicating system in engagement with said guard closure and an interlock whereby upon movement of said guard closure by said tester the interlock is tested to determine if it is functioning correctly.

44. The device as set forth in claim 43 in which the tester is secured to said interlock forming a tester interlock assembly and one of them is mounted on a compliant base secured to a support whereby if the tester determines that the guard closure does not open the tester interlock assembly will retract from said guard closure and permit the interlock to be tested.

45. The device as set forth in claim 44 which includes a mechanism for testing the interlock.

46. The device as set forth in claims 44 or 45 including a blocking member secured to the support and positioned to be engaged by said tester interlock assembly by the guard closure and interlock testing, including sensing devices which when engaged indicate that the interlock has been moved to its testing position.

47. The device as set forth in claim 43 in which the tester assembly is secured to a plurality of interlocks forming a tester interlock assembly and one of the interlocks is mounted on a compliant base secured to a support whereby if the tester assembly determines that the guard closure does not initially open, the tester-interlock assembly will retract from said guard closure and permit said interlock to be tested and if the guard closure is subsequently opened, the testing means for the guard closure will show that it is opened and has thus failed the test.

48. The device as set forth in claims 44 or 47 including means for sensing that the guard closure, tester and interlock has returned to an original position in which the guard closure is closed, the tester has been released from the guard closure and the interlock and tester has moved to a guard closed position.

49. The device as set forth in claim 48 including means for sensing that the guard closure is either partially or fully closed, and the interlock is in its guard open position.

50. The device as set forth in claim 48 including means for sensing that the guard closure has moved to its fully closed position and the interlock is in its guard open position.

* * * * *